United States Patent
Nakamura

(10) Patent No.: US 7,995,821 B2
(45) Date of Patent: Aug. 9, 2011

(54) IMAGE PROCESSING SYSTEM AND IMAGE PROCESSING METHOD

(75) Inventor: Keigo Nakamura, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 330 days.

(21) Appl. No.: 12/398,023

(22) Filed: Mar. 4, 2009

(65) Prior Publication Data

US 2009/0226062 A1    Sep. 10, 2009

(30) Foreign Application Priority Data

Mar. 5, 2008    (JP) ................ 2008-054329

(51) Int. Cl.
*G06K 9/00* (2006.01)
*G06K 9/34* (2006.01)
*G06K 9/46* (2006.01)
*G06K 9/66* (2006.01)
*G06K 9/54* (2006.01)
*G06K 9/60* (2006.01)
*A61B 6/00* (2006.01)
*G01N 23/00* (2006.01)
*G21K 1/12* (2006.01)
*H05G 1/60* (2006.01)

(52) U.S. Cl. ........ 382/128; 382/131; 382/154; 382/173; 382/190; 382/305; 378/4; 707/915

(58) Field of Classification Search .................. 382/100, 382/128–132, 154, 181, 190, 276, 298–300, 382/305; 378/1, 4; 707/915
See application file for complete search history.

(56) References Cited

U.S. PATENT DOCUMENTS

| | | | | |
|---|---|---|---|---|
| 5,097,839 A | * | 3/1992 | Allen | 600/426 |
| 6,373,917 B1 | * | 4/2002 | Roder | 378/22 |
| 6,826,297 B2 | * | 11/2004 | Saito et al. | 382/131 |

(Continued)

FOREIGN PATENT DOCUMENTS

JP    8-188792 A    7/1996

(Continued)

OTHER PUBLICATIONS

Office Action dated Mar. 2, 2010 issued in corresponding Japanese patent application No. 2008-054329.

*Primary Examiner* — Vu Le
*Assistant Examiner* — Nathan Bloom
(74) *Attorney, Agent, or Firm* — Birch, Stewart, Kolasch & Birch, LLP

(57) ABSTRACT

In a system where an image processing device applies image processing to medical images obtained from an image storage device, the load of communication and image processing are reduced, thereby improving the processing efficiency of the entire system. A controlling unit determines whether it is possible to determine a image processing result for a cross-sectional image taken at a point along a composition axis in an original image based on a image processing result of cross-sectional images sent so far from the image storage device. If it is impossible to determine the result, the next cross-sectional image to be processed is determined, and the cross-sectional image is sent from the image storage device to the image processing device. If it is possible to determine the result, the result of the image processing is determined without sending a new cross-sectional image from the image storage device to the image processing device.

12 Claims, 27 Drawing Sheets

U.S. PATENT DOCUMENTS

| | | |
|---|---|---|
| 7,245,747 B2 | 7/2007 | Oosawa |
| 2004/0086076 A1* | 5/2004 | Nagaoka et al. .................. 378/4 |
| 2007/0269089 A1 | 11/2007 | Sakaida |
| 2008/0240494 A1* | 10/2008 | Oosawa et al. ............... 382/100 |
| 2009/0041323 A1* | 2/2009 | Lachaine et al. .............. 382/131 |

FOREIGN PATENT DOCUMENTS

| | | |
|---|---|---|
| JP | 9-187444 A | 7/1997 |
| JP | 2001-166911 A | 6/2001 |
| JP | 2001-508203 | 6/2001 |
| JP | 2002-216108 A | 8/2002 |
| JP | 2002-253539 A | 9/2002 |
| JP | 2003-265463 A | 9/2003 |
| JP | 2004-194869 A2 | 7/2004 |
| JP | 2005-108195 A | 4/2005 |
| JP | 2005-124812 A | 5/2005 |
| JP | 2005-304831 A | 11/2005 |
| JP | 2008-197968 A | 8/2006 |
| JP | 2007-307205 A | 11/2007 |
| JP | 2008-36252 A | 2/2008 |
| JP | 2008-36262 A | 2/2008 |
| WO | WO 98/19263 A1 | 5/1998 |

* cited by examiner

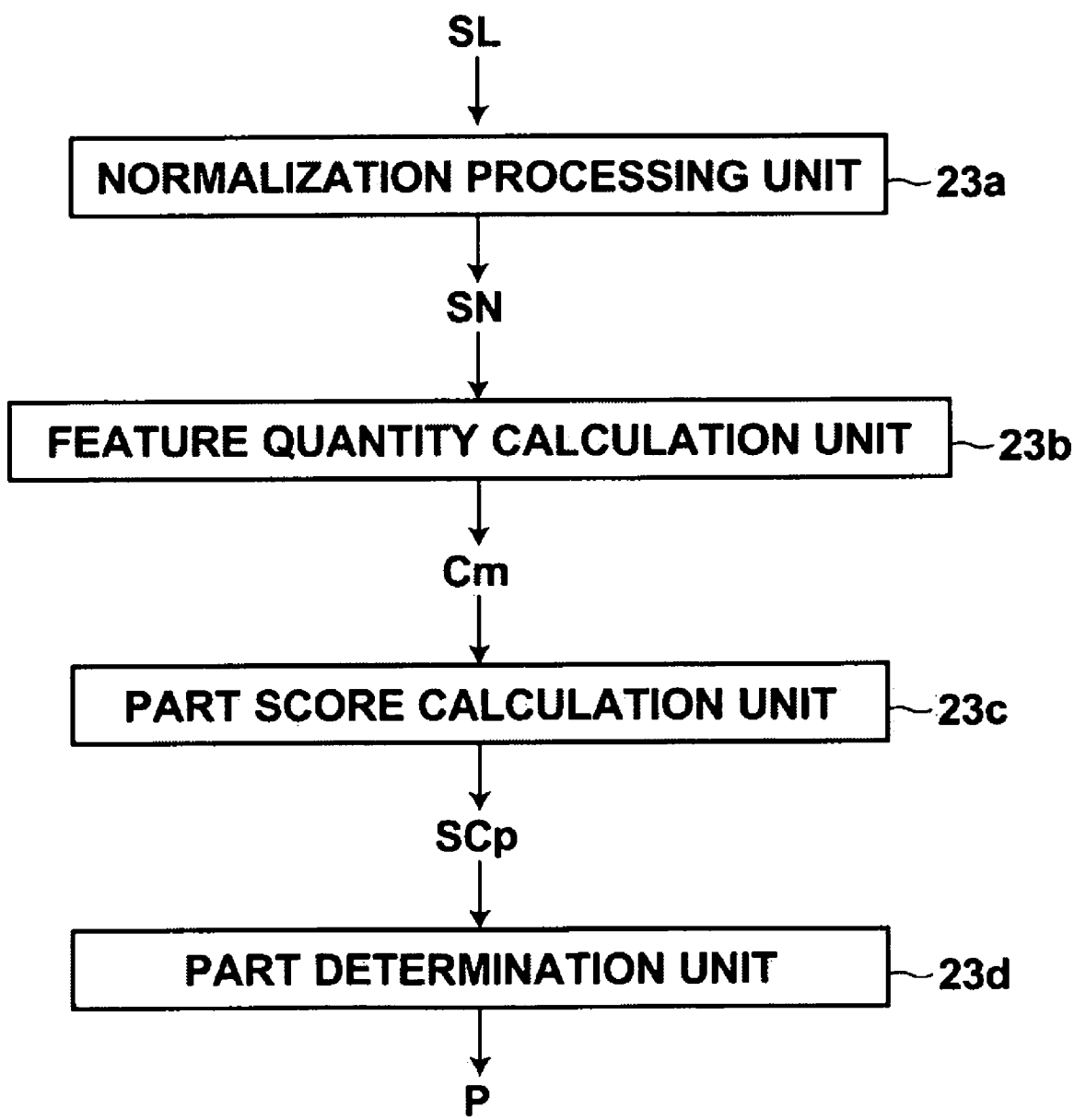

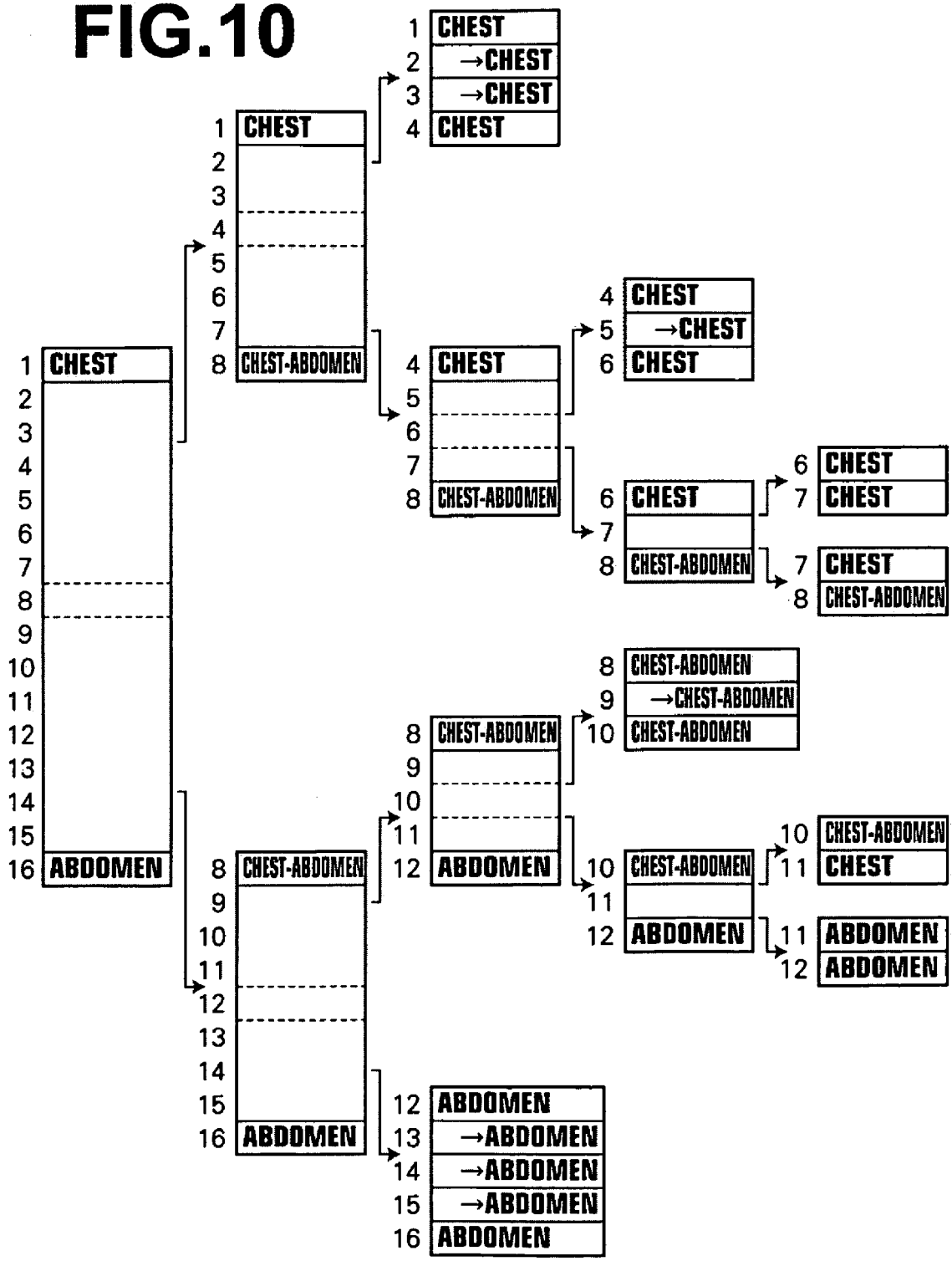

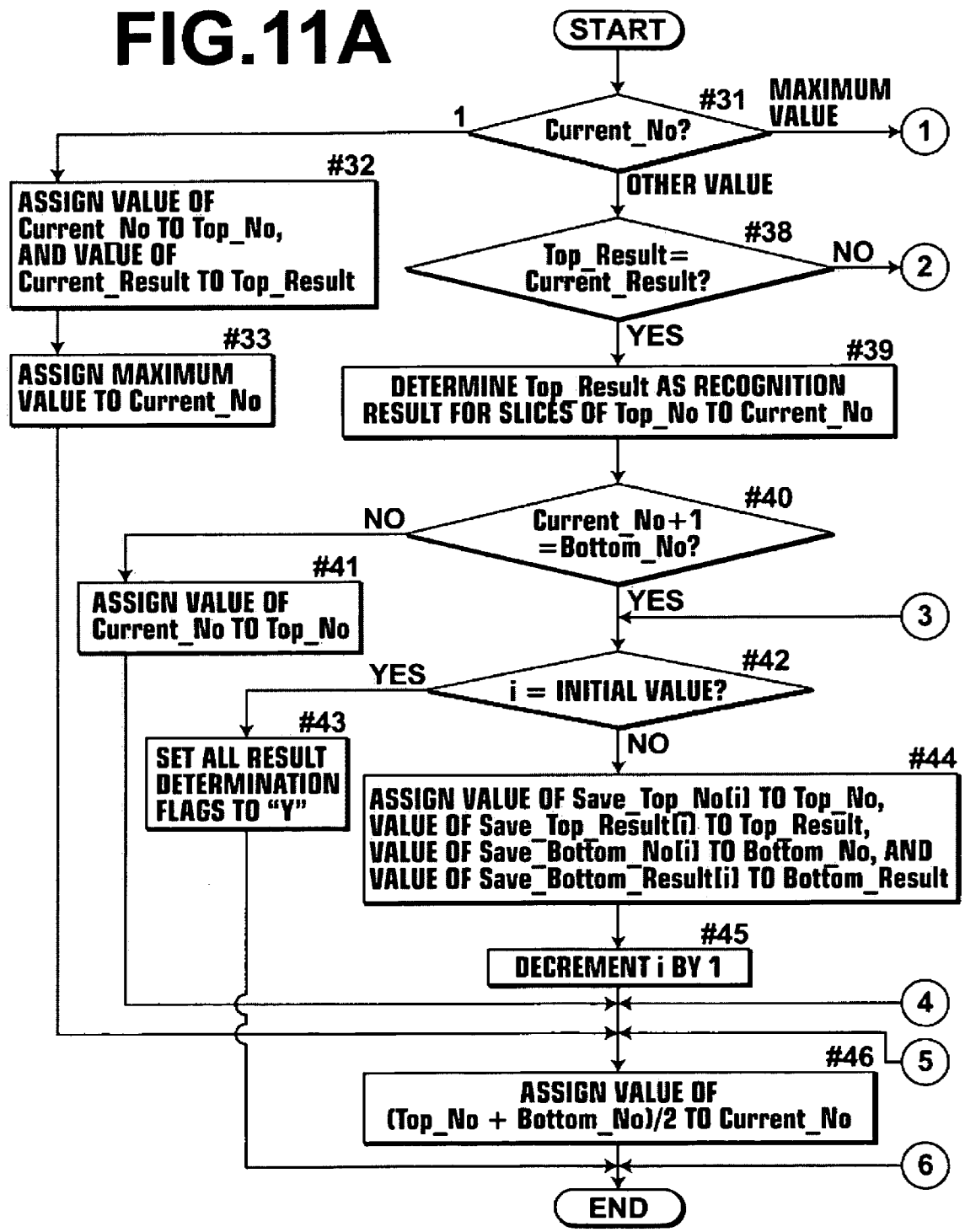

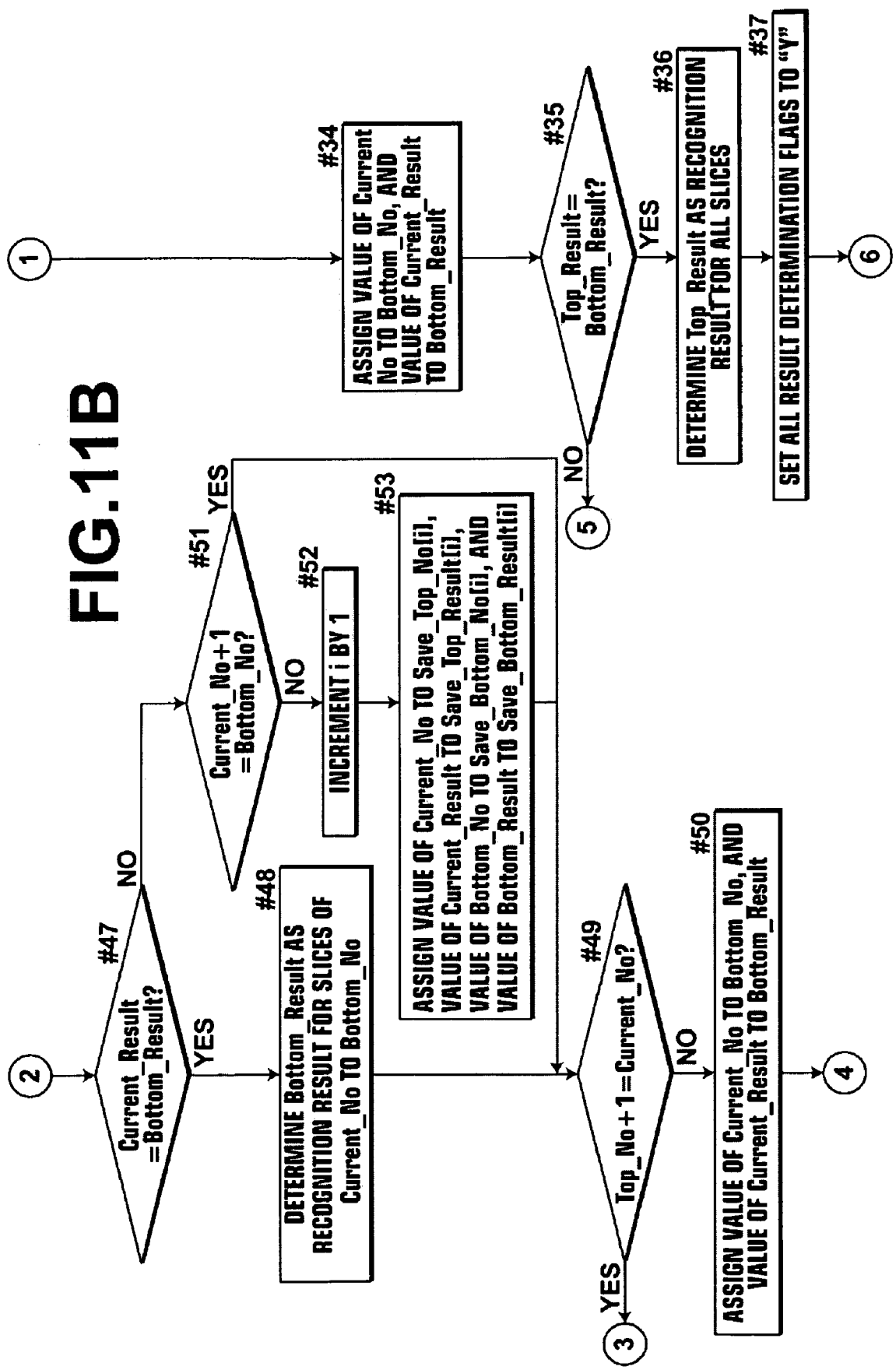

FIG.12

BLK₁₂₀

| 1 | CHEST |
| 2 | |
| 3 | |
| 4 | CHEST |
| 5 | |
| 6 | |
| 7 | CHEST |
| 8 | |
| 9 | |
| 10 | CHEST-ABDOMEN |
| 11 | |
| 12 | |
| 13 | ABDOMEN |
| 14 | |
| 15 | |
| 16 | ABDOMEN |

BLK₁₂₁

| 1 | CHEST |
| 2 | →CHEST |
| 3 | →CHEST |
| 4 | CHEST |

BLK₁₂₂

| 4 | CHEST |
| 5 | →CHEST |
| 6 | →CHEST |
| 7 | CHEST |

BLK₁₂₃

| 7 | CHEST |
| 8 | CHEST-ABDOMEN |
| 9 | CHEST-ABDOMEN |
| 10 | CHEST-ABDOMEN |

BLK₁₂₄

| 10 | CHEST-ABDOMEN |
| 11 | ABDOMEN |
| 12 | ABDOMEN |
| 13 | ABDOMEN |

BLK₁₂₅

| 13 | ABDOMEN |
| 14 | →ABDOMEN |
| 15 | →ABDOMEN |
| 16 | ABDOMEN |

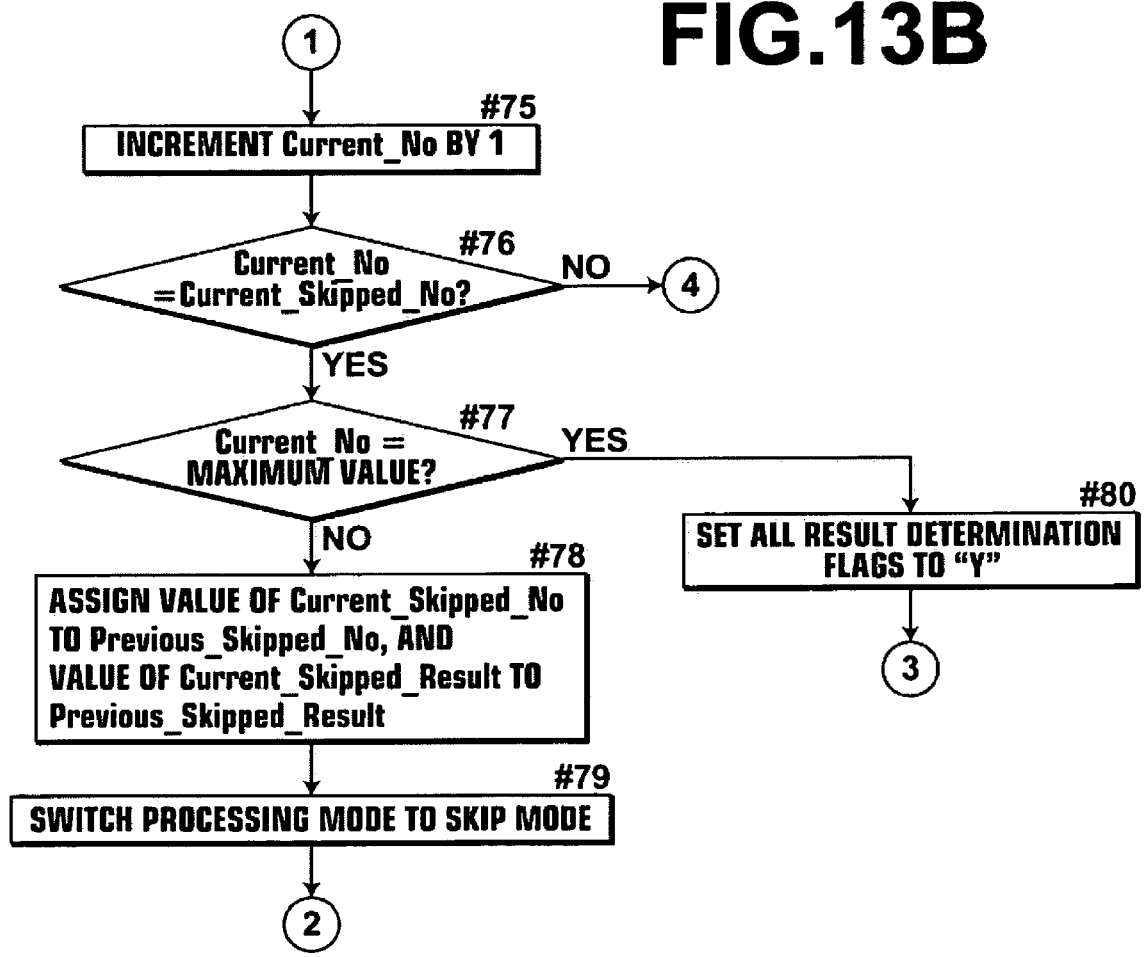

FIG.14

RST₁₄₁

| | |
|---|---|
| 1 | NOT DETECTED |
| 11 | DETECTED |
| 21 | NOT DETECTED |
| 30 | NOT DETECTED |

RST₁₄₂

| | |
|---|---|
| 1 | NOT DETECTED |
| 2 | |
| | →NOT DETECTED |
| 6 | |
| 7 | NOT DETECTED |
| 8 | DETECTED |
| 9 | DETECTED |
| 10 | DETECTED |
| 11 | DETECTED |
| 12 | DETECTED |
| 13 | NOT DETECTED |
| 14 | |
| | →NOT DETECTED |
| 20 | |
| 21 | NOT DETECTED |
| | →NOT DETECTED |
| 30 | NOT DETECTED |

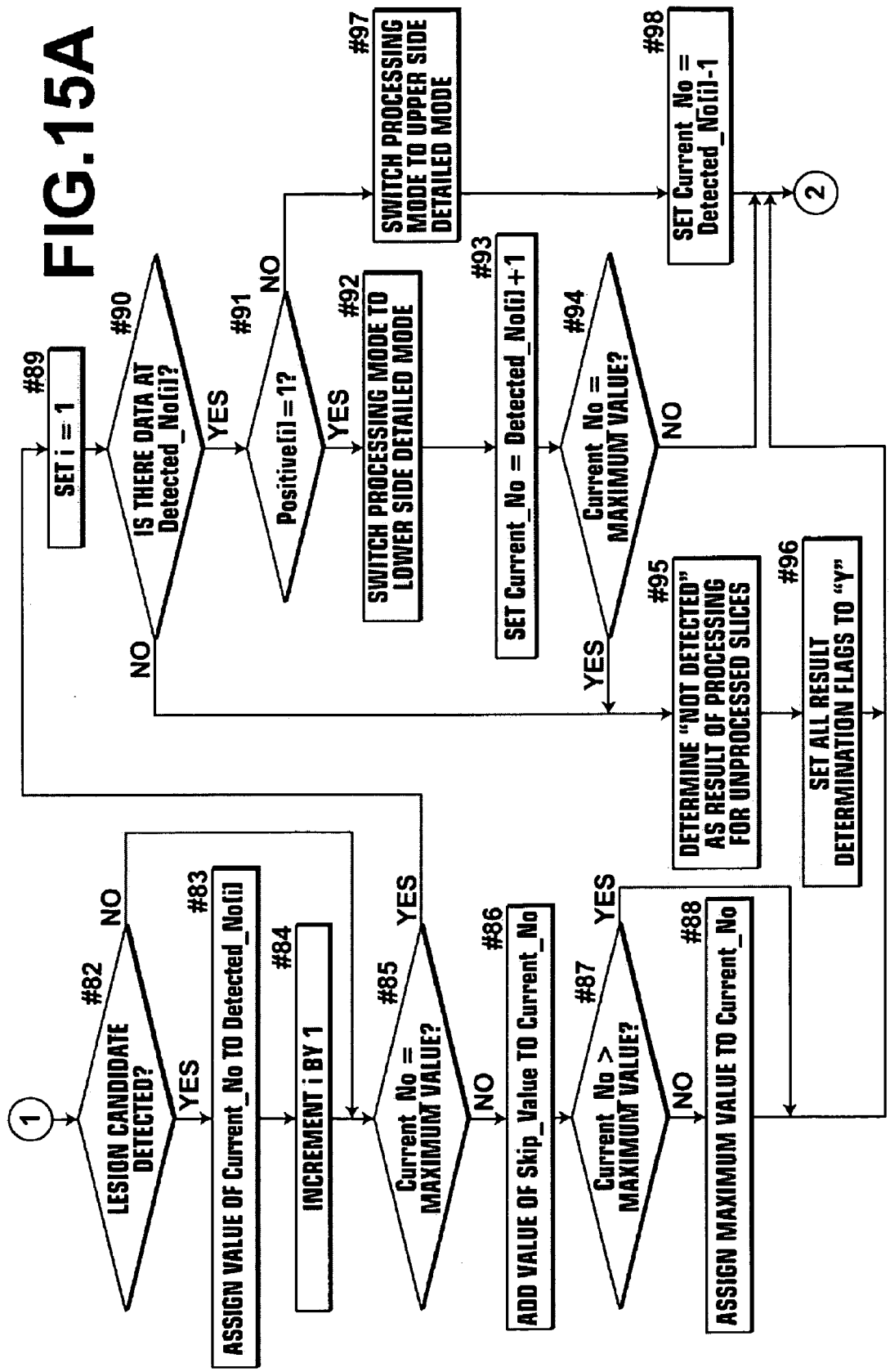

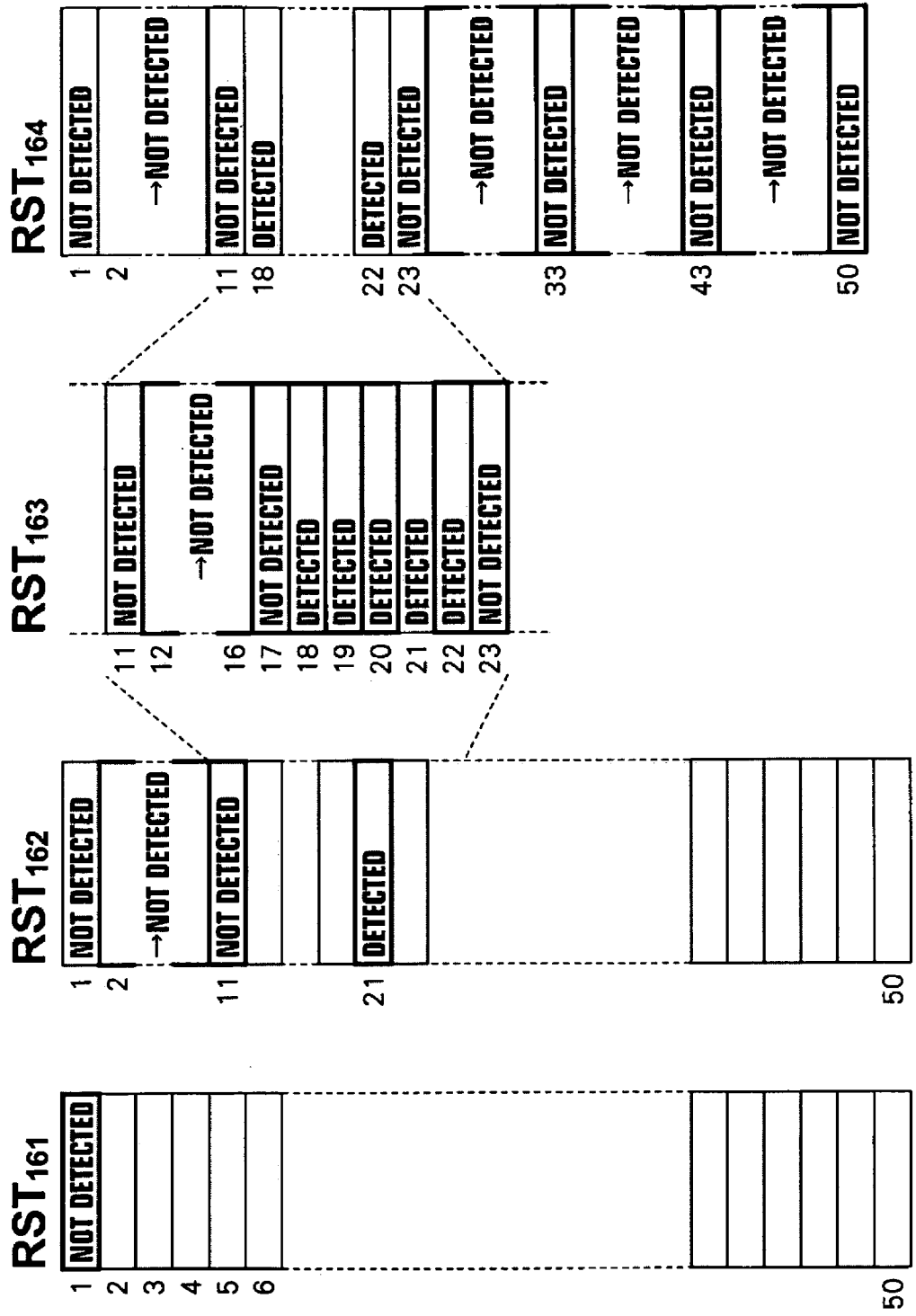

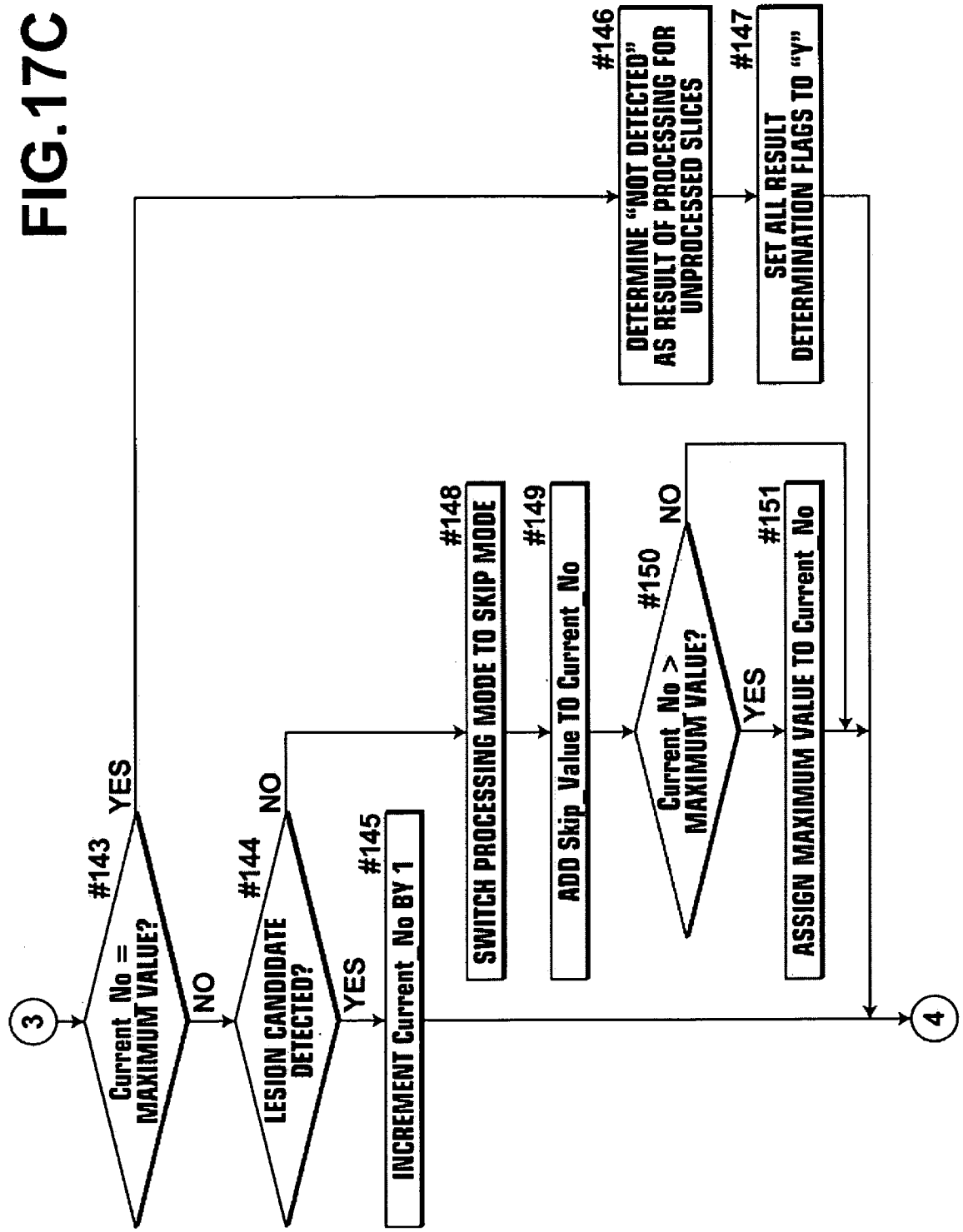

IMAGE PROCESSING SYSTEM AND IMAGE PROCESSING METHOD

BACKGROUND OF THE INVENTION

1. Field of the Invention

The present invention relates to a system in which a device for carrying out medical image processing obtains medical image data from a device for storing the medical image data and applies the image processing to the obtained image data.

2. Description of the Related Art

As a form of a client-server type medical image processing system, a system is known in which, in order to display a medical image on a client terminal, the entire original image data is transferred to the client terminal from an image storage server for storing medical image data, and the client terminal applies image processing desired by the user to the transferred original image data to display the processed image. In such a system, once the original image data is transferred to the client terminal, the client terminal applies the image processing to the image data held thereon, and therefore, higher response at the client terminal can be provided since no data transfer is carried out during the image processing.

However, since the data volume of original image data has been increased due to the higher processing speed and higher performance, such as multi-slice capability, of imaging modalities, such as CT and MRI apparatuses, and the resulting higher resolution of taken images, the communication load for transferring the original image data from the image storage server to the client terminal and the load of image processing at the client terminal have been increased.

In order to address this situation, a system is known in which the image storage server is provided with the image processing capability (see, for example, Japanese Unexamined Patent Publication No. 2001-166911). In this system, the client terminal retrieves from the image storage server a part of image data forming an image stored in the image storage server and performs preliminary image processing using the part of the data to determine image processing conditions. Then, the client terminal sends the determined image processing conditions to the image storage server so that the image storage server performs the image processing according to the image processing conditions and transfers the processed image to the client terminal. In this system, the partial image data of the original image data which is necessary for determining the image processing conditions and the processed image data having the data volume smaller than that of the original image are transferred from the image storage server to the client terminal. Therefore, compared to a case where the entire original image data is transferred from the image storage server to the client terminal, reduction of the transferred data volume is expected and thus the communication load is reduced. Further, since the image processing conditions are determined only at the client terminal using the retrieved partial image data, the response at the client terminal is maintained.

However, depending on business requirements at the user side and/or various circumstances, such as performances of the image storage server, the client terminal and the network forming the system, it may be difficult to provide the image processing capability on the image storage server.

SUMMARY OF THE INVENTION

In view of the above-described circumstances, the present invention is directed to reducing, in a system in which a device for carrying out medical image processing obtains medical image data from a device for storing the medical image data and applies the image processing to the obtained image data, communication and processing loads and image processing load thereby improving processing efficiency of the entire system.

The present invention utilizes the fact that, depending on the content of the medical image processing, a result desired by the user can be obtained without using the entire original image data.

An aspect of the image processing system of the invention includes: an image storage device and an image processing device being connected to be able to communicate with each other via a network, wherein the image storage device comprises: an image database for storing image data of a three-dimensional or higher-dimensional original image representing a subject; and an image sending means for sending, to the image processing device, image data of a plurality of cross-sectional images representing cross-sections taken at a plurality of given points along a predetermined composition axis in the original image, the image sending means sending the image data of the cross-sectional images more than one times such that the image data of a different cross-sectional image taken at a different point is sent each time, the image processing device comprises: an image receiving means for receiving the image data of the cross-sectional images sent by the image sending means; and an image processing means for applying predetermined image processing to the image data of the cross-sectional images, and the image processing system further comprises a controlling means, wherein the controlling means determines, based on a predetermined determination criterion using a result of the image processing applied by the image processing means to the image data of the cross-sectional images sent so far, whether it is possible to determine a result of the image processing for the image data of a cross-sectional image representing a cross-section taken at an arbitrary point along the composition axis in the original image based on the result of the image processing applied by the image processing means to the image data of the cross-sectional image sent so far, if it is determined to be possible to determine the result, the result of the image processing is determined for the image data of the cross-sectional image representing the cross-section taken at the arbitrary point, if it is determined to be impossible to determine the result, the controlling means determines image data of a next cross-sectional image to be processed by the image processing means to determine the result of the image processing, and the controlling means causes the image sending means to send the image data of the next cross-sectional image to be processed.

An aspect of the image processing method of the invention, which is carried out in an image processing system including an image storage device and an image processing device being connected to be able to communicate with each other via a network, includes: sending, from the image storage device to the image processing device, image data of a plurality of cross-sectional images representing cross-sections taken at a plurality of given points along a predetermined composition axis in a three-dimensional or higher-dimensional original image representing a subject, the image data being sent more than one times such that the image data of a different cross-sectional image taken at a different point is sent each time; receiving the sent image data of the cross-sectional images and applying predetermined image processing to the image data of the cross-sectional images at the image processing device; determining, based on a predetermined determination criterion using a result of the image processing applied by the image processing device to the image data of the cross-sectional images sent so far, whether it is possible to determine a result of the image processing for the image data of a cross-sectional image representing a cross-section taken at an arbitrary point along the composition axis in the original image based on the result of the image processing applied by the image processing device to the image data of the cross-sectional image sent so far; if it is determined to be possible to determine the result, determining the result of the image processing for the image data of the cross-sectional image representing the cross-section taken at the arbitrary point, if it is determined to be impossible to determine the result, determining image data of a next cross-sectional image to be processed by the image processing device to determine the result of the image processing; and sending the image data of the next cross-sectional image to be processed from the image storage device to the image processing device.

A computer-readable recording medium containing a program of the invention is run on an image processing system including an image storage device and an image processing device which are connected to be able to communicate with each other via a network. The program causes the image storage device to send, to the image processing device, image data of a plurality of cross-sectional images representing cross-sections taken at a plurality of given points along a predetermined composition axis in a three-dimensional or higher-dimensional original image representing a subject, the image data being sent more than one times such that the image data of a different cross-sectional image taken at a different point is sent each time; causes the image processing device to receive the sent image data of the cross-sectional images and to apply predetermined image processing to the image data of the cross-sectional images; and causes any of devices in the image processing system to determine, based on a predetermined determination criterion using a result of the image processing applied by the image processing device to the image data of the cross-sectional images sent so far, whether it is possible to determine a result of the image processing for the image data of a cross-sectional image representing a cross-section taken at an arbitrary point along the composition axis in the original image based on the result of the image processing applied by the image processing device to the image data of the cross-sectional image sent so far, and if it is determined to be possible to determine the result, to determine the result of the image processing for the image data of the cross-sectional image representing the cross-section taken at the arbitrary point, or if it is determined to be impossible to determine the result, to determine image data of a next cross-sectional image to be processed by the image processing device to determine the result of the image processing, and to send the image data of the next cross-sectional image to be processed from the image storage device to the image processing device.

Further, the present invention may be implemented in the form of the above-described image storage device, the above-described image processing device including the controlling means, or a computer-readable recording medium containing a program that causes a computer to function as any of these devices.

Now, details of the invention are described. In the following description, "a cross-sectional image representing a cross-section taken at a point along a predetermined composition axis" may be expressed in short as "the cross-sectional image at the point", and "a result of the image processing for a cross-sectional image representing a cross-section taken at a point along a predetermined composition axis" may be expressed in short as "the result of the image processing corresponding to the point".

In the invention, the "three-dimensional or higher-dimensional original image representing a subject" may represent either a static state or a dynamic state of the subject.

The "predetermined composition axis" maybe an axis indicating a spatial direction, such as the body axis direction of the subject, or an axis indicating time. Therefore, the "cross-section" may be a planar cross-section or a temporal cross-section.

Specifically, if the original image represents a three-dimensional static state of the subject, the cross-sectional image is an image of a cross-section perpendicular to the predetermined composition axis in the three-dimensional space, such as an axial cross-sectional image of a cross-section (axial cross-section) perpendicular to the body axis of the subject. If the original image represents a two-dimensional dynamic state of the subject, the cross-sectional image is an image representing a two-dimensional state at a certain point of time, i.e., a frame forming a moving image. If the original image represents a three-dimensional dynamic state of the subject, the cross-sectional image is, for example, an axial cross-sectional image of a cross-section perpendicular to the body axis direction of the subject at a certain point of time.

The "image data of the original image" may be a set of image data of cross-sectional images taken at a plurality of points along the predetermined composition axis, or may be a set of image data of cross-sectional images taken at a plurality of points along a composition axis different from the predetermined composition axis. Further, the image data may be based on a multidimensional coordinate system, such as voxel data. In this case, the predetermined composition axis may not be one of coordinate axes of the coordinate system of the image data.

Therefore, if the image data of the original image is formed by a set of image data of cross-sectional images taken at a plurality of points along the predetermined composition axis, the image sending means obtains the image data of a cross-sectional image determined by the controlling means from the image database and sends the image data to the image processing device. In other cases, the cross-sectional image determined by the controlling means is reconstructed based on the image data of the original image stored in the image database, and the image sending means sends the image data of the reconstructed cross-sectional image to the image processing device.

The image sending means may send the image data of a single cross-sectional image at a time, or may send the image data of a plurality of cross-sectional images at a time.

The "predetermined image processing" herein may specifically include, for example, image analysis and image recognition, such as detection of a predetermined object or a predetermined region from the cross-sectional image and classification of the object in the cross-sectional image.

The operation of "determining a result of the image processing for the image data of a cross-sectional image representing a cross-section taken at an arbitrary point along the composition axis in the original image based on the result of the image processing applied by the image processing means to the image data of the cross-sectional image sent so far" includes determining the result of the image processing for a cross-sectional image representing a cross-section taken at a point along the composition axis, which has not yet been sent or subjected to the image processing, based on the result of the image processing applied by the image processing means to the image data of the cross-sectional images sent so far. A specific example thereof may include estimating the result of the image processing for a cross-sectional image which has not yet been sent or subjected to the image processing through interpolation using the actual result of the image processing applied to the cross-sectional images taken at points in the vicinity of the point. The determination may involve use of anatomic features of the subject, for example.

The "predetermined determination criterion" is a criterion determined in advance for determining whether or not the result of the image processing corresponding to a point along the composition axis, which is determined without actually applying the image processing as described above, is the same as or practically near enough to a result of the image processing which would be obtained if actual image processing were applied to the cross-sectional image taken at the point. The "result of the image processing applied by the image processing means to the image data of the cross-sectional images sent so far" is determined based on this predetermined determination criterion. It should be noted that the specific content of the predetermined determination criterion varies depending on the content of the "predetermined image processing".

The "determination of a result of the image processing" and the "determination as to whether it is possible to determine the result" above may include determining a result of the image processing for a cross-sectional image which has not yet been processed by the image processing means before the latter determination. That is, first, among the image data which have not yet been processed by the image processing means, the result of the image processing is sequentially determined for the image data for which the result of the image processing can be determined based on the result of the image processing of the image data which have already been processed by the image processing means. If there remains image data for which the result of the image processing cannot be determined, it may be determined that the determination of the result of the image processing is impossible. In contrast, if there remains no image data for which the result of the image processing cannot be determined, it may be determined that the determination of the result of the image processing is possible. In this case, the result of the image processing has been determined for all the image data to be processed at a point of time when it is determined that the determination of the result of the image processing is possible.

Until it is determined that the determination of the result of the image processing is possible, the controlling means may repeat the operations to determine the image data of a next cross-sectional image to be processed, to cause the image sending means to send the image data of the next the cross-sectional image to be processed, and to determine whether it is possible to determine a result of the image processing, based on the result of the image processing applied by the image processing means to the image data of the cross-sectional images sent so far, which includes the result of the image processing applied by the image processing means to the image data of the next cross-sectional image to be processed.

The controlling means may be provided at any device in the image processing system. Namely, the controlling means may be included in one of the image storage device and the image processing device, or may be included in another device that is able to communicate with the image storage device and the image processing device. Alternatively, the controlling means may be implemented by cooperation of two or more of the above devices.

It should be noted that instructions of the program contained in the recording medium of the invention may use functions of the operating system or other software on a computer on which the program is run. For example, an instruction to cause the computer to send the image data may use the network communication control function of the operating system of the computer to send the image data, namely, an instruction at an upper level (such as the application level) of the layered structure of the network.

BRIEF DESCRIPTION OF THE DRAWINGS

FIG. 7 is a block diagram schematically illustrating the configuration for carrying out the imaged part recognition process through image analysis by an image analysis unit, FIG. 8A schematically illustrates how landmarks are set for normalization of a tomographic image (when the number of labels=1 and a human body region is long in the transverse direction), FIG. 8B schematically illustrates how the landmarks are set for normalization of a tomographic image (when the number of labels =1 and the human body region is long in the longitudinal direction), FIG. 8C schematically illustrates how the landmarks are set for normalization of a tomographic image (when the number of labels =2), FIG. 8D schematically illustrates how the landmarks are set for normalization of a tomographic image (when the number of labels=3), FIG. 9A schematically illustrates how slice images between recognized slice images are handled in the imaged part recognition process, FIG. 9B schematically illustrates how slice images between recognized slice images are handled in the imaged part recognition process, FIG. 10 schematically illustrates one example of a result of processing of a first implementation example of the imaged part recognition process carried out in the image processing system of the invention, FIG. 11A is a flow chart of the first implementation example of the imaged part recognition process carried out in the image processing system of the invention, FIG. 11B is a flow chart of the first implementation example of the imaged part recognition process carried out in the image processing system of the invention, FIG. 12 schematically illustrates one example of a result of processing of a second implementation example of the imaged part recognition process carried out in the image processing system of the invention, FIG. 13B is a flow chart of the second implementation example of the imaged part recognition process carried out in the image processing system of the invention, FIG. 14 schematically illustrates one example of a result of processing of a first implementation example of a lesion candidate detection process carried out in the image processing system of the invention, FIG. 15A is a flow chart of the first implementation example of the lesion candidate detection process carried out in the image processing system of the invention, FIG. 17C is a flow chart of the second implementation example of the lesion candidate detection process carried out in the image processing system of the invention, FIG. 18 schematically illustrates one example of a result of processing of an implementation example of a human body region extraction process carried out in the image processing system of the invention.

DESCRIPTION OF THE PREFERRED EMBODIMENTS

Hereinafter, an image processing system according to embodiments of the present invention will be described with reference to the drawings. First, the basic configuration and the basic process flow of the image processing system are described, and then, implementation examples of an imaged part recognition process, a lesion candidate detection process, and a human body region extraction process implemented on this system are described, and finally, a variation of the configuration of this system is described.

Figure 1:
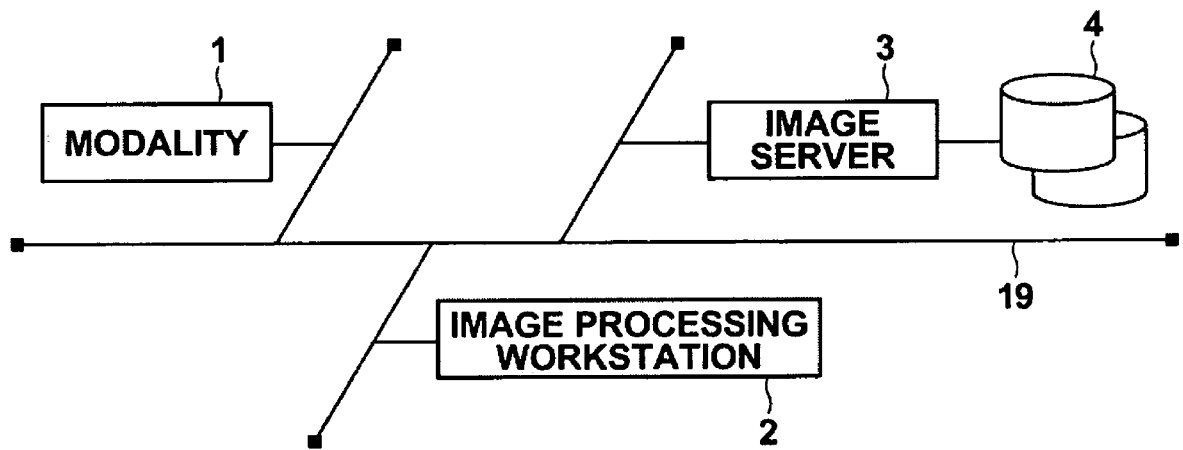
FIG. 1 illustrates the schematic configuration of a medical information system incorporating an image processing system according to embodiments of the present invention, FIG. 2 schematically illustrates functional blocks of the image processing system and the configuration of an image database according to one embodiment of the invention, FIG. 3 schematically illustrates a part of the configuration of an associated information database.

1. Basic Configuration And Basic Process Flow Of The Image Processing System Of The Invention FIG. 1 illustrates the schematic configuration of a medical information system incorporating the image processing system according to embodiments of the invention. As shown in the drawing, the system includes an imaging apparatus (modality) 1 for taking medical images, an image processing workstation 2, an image server 3 and an image database 4, which are connected to be able to communicate with each other via a network 19. The image processing workstation 2 and the image server 3 are controlled by an image processing program, which is one embodiment of the invention, installed from a recording medium, such as a CD-ROM. Alternatively, the program may be downloaded from a server connected via a network, such as the Internet, before being installed.

The modality 1 includes a device that takes images of a part to be examined of a subject to generate image data of the images representing the part, and outputs the image data added with associated information, such as examination information and patient information. The associated information may be defined by a standard, such as DICOM standard, or may be of a format according to manufacturer's (such as the manufacturer of the modality) own standard. Specific examples of the modality include CT (Computed Tomography), MRI (Magnetic Resonance Imaging), PET (Positron Emission Tomography), and ultrasonic imaging apparatuses. In this embodiment, the image data represents a three-dimensional image of a part to be examined of a subject taken, for example, with a CT or MRI apparatus, and is formed as a set of image data of axial cross-sectional images (slice images) taken with a predetermined slice interval and a predetermined slice thickness.

The image processing workstation 2 is a computer formed by a processing unit, at least one high-definition display monitor, an input device such as a keyboard and a mouse, and a communication interface for communication with the image server 3, and the like, via the network 19. The image processing workstation 2 has installed thereon a software program for carrying out various image processing, such as image analysis, on the inputted image data representing the image of the part to be examined of the subject.

The image server 3 is formed by a general-purpose computer having a relatively high processing capacity, on which a software program that implements a function of a database management system (DBMS) is installed. The image server 3 includes a large capacity storage forming the image information database 4. The storage may be a large-capacity hard disk device connected to the image server 3 via the data bus, or may be a disk device connected to a NAS (Network Attached Storage) or a SAN (Storage Area Network) connected to the network 19. The image server 3 also has a communication interface for communication with the modality 1, the image processing workstation 2, and the like, via the network 19.

The network 19 is a local area network connecting various devices within a hospital. If, however, another image processing workstation 2 is provided at another hospital or clinic, the network 19 may include local area networks of these hospitals connected via the Internet or a dedicated line. In either case, the network 19 is desirably a network, such as an optical network, that can achieve high-speed transfer of the image information.

Figure 2:
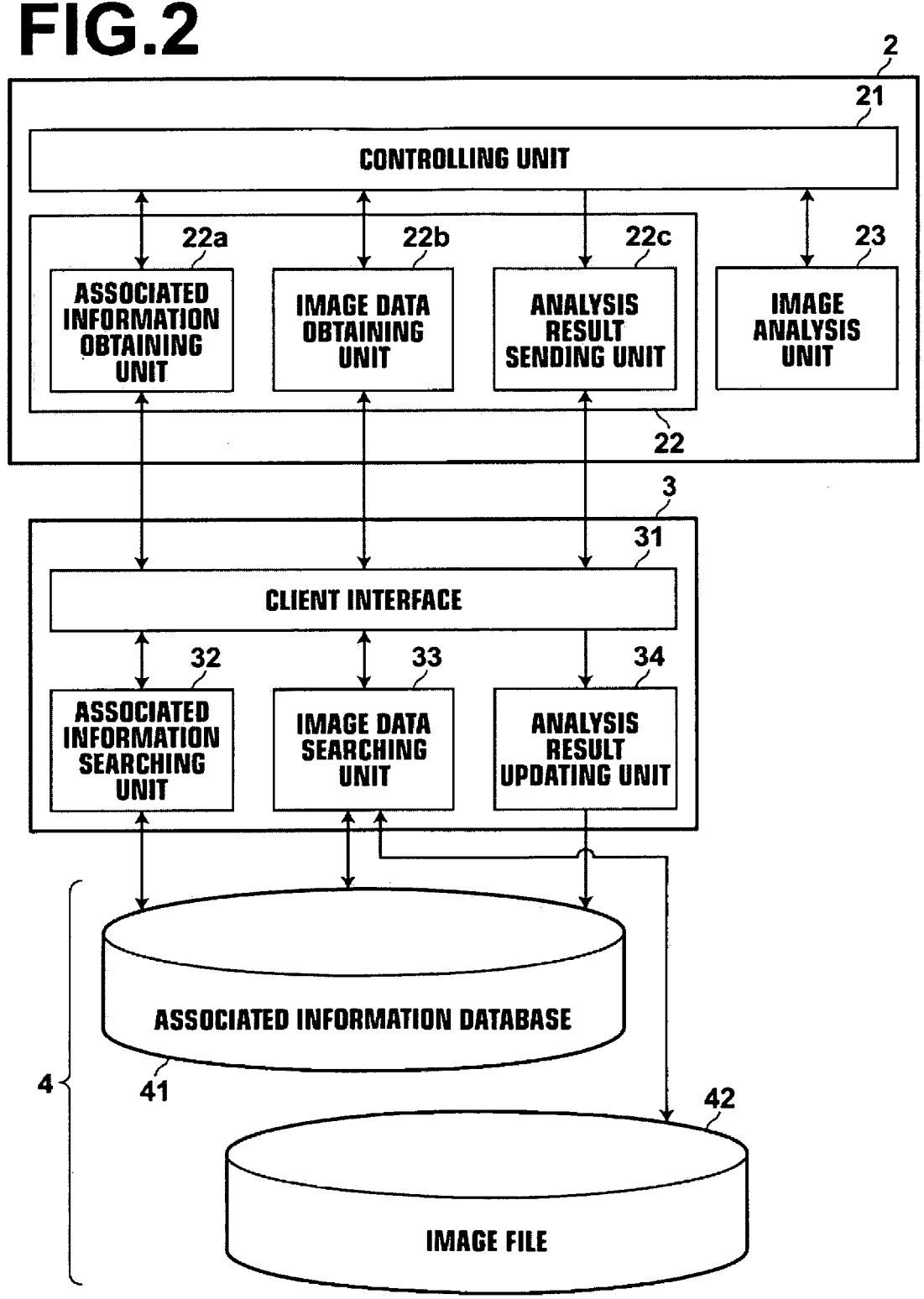

FIG. 2 schematically illustrates functional blocks of the image processing system according to one embodiment of the invention and the configuration of the image database 4. As shown in the drawing, the image processing system is formed by the image processing workstation 2 and the image server 3 including the image database 4, which are connected to be able to communicate with each other via the network 19 (which is not explicitly shown in FIG. 2. See FIG. 1). In the image processing system, image data of a three-dimensional image formed by a set of slice images representing the subject retrieved by the image server 3 from the image database 4 is transferred to the image processing workstation 2. Then, the image processing workstation 2 applies a predetermined image analysis process to the transferred image data, and the analysis result is transferred to the image server 3. Then, the image server 3 registers the transferred analysis result on the image database 4.

Figure 3:
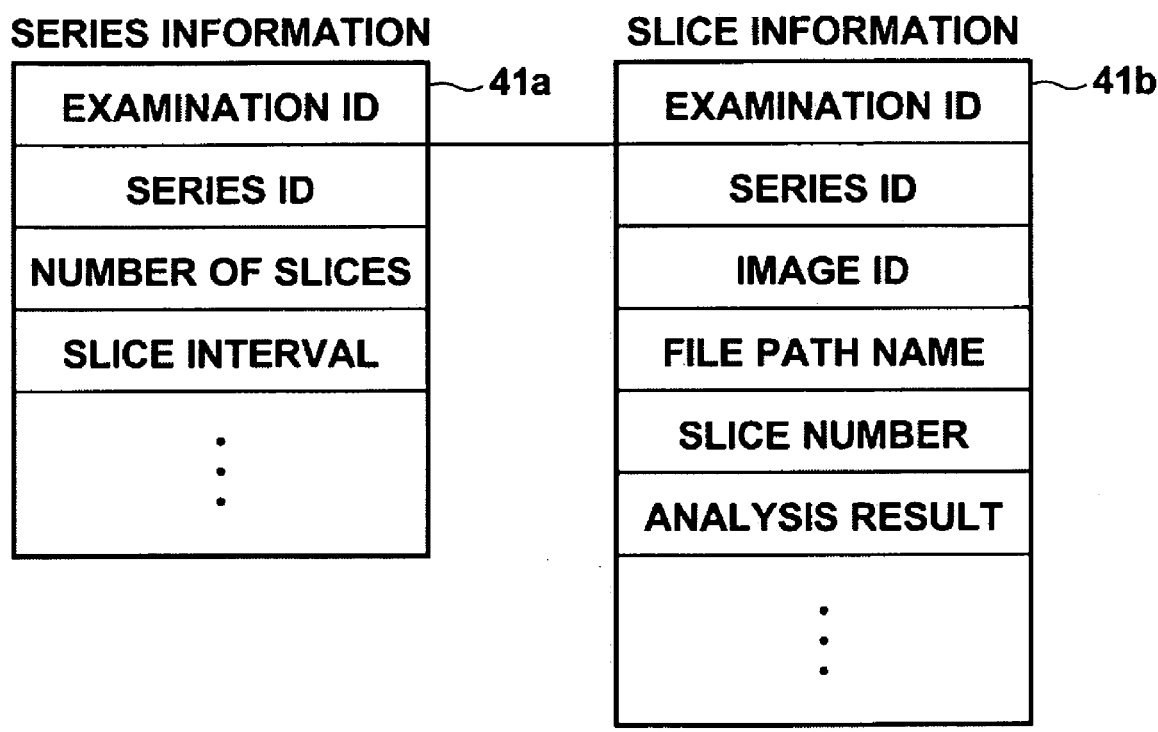

The image database 4 is formed by an associated information database 41 and an image file 42. The image data transferred from the modality 1 to the image server 3 is stored as the image file 42, and the associated information transferred together with the image data is stored in the associated information database 41. FIG. 3 schematically illustrates a part of the configuration of the associated information database 41. As shown in the drawing, the associated information database 41 includes a series information table 41*a* and a slice information table 41*b*. The series information table 41*a* manages information of each series in an examination. Namely, in the series information table 41*a*, the number of slices, the slice interval, and the like, of the slice images generated during a certain series in a certain examination are registered with being associated with an examination ID for identifying the examination and a series ID for identifying the series in the examination. The slice information table 41*b* manages information of each slice image. Namely, in the slice information table 41*b*, the slice number of the slice image, the result of image analysis of the slice image, and the like, are registered with being associated with the examination ID, the series ID and an image ID for identifying the slice image. The series information table 41*a* and the slice information table 41*b* are associated with each other by the examination ID and the series ID. For example, the associated information, such as the number of slices, stored in the series information table 41*a* represents the information of plurality of slice images stored in the slice information table 41*b* which are associated with the same examination ID and series ID as those of the associated information. The image file 42 is formed for each slice image, and each slice image is stored in a file having the image ID as the file name thereof. Each slice image stored in the image file 42 and the associated information of the image stored in the associated information database 41 are associated with each other by the image ID and a file path name stored in the slice information table 41*b*.

The image processing workstation 2 includes a controlling unit 21, a server interface 22 and an image analysis unit 23.

The controlling unit 21 invokes the functions of the server interface 22 and the image analysis unit 23 in a predetermined order, and controls the entire image processing of the invention. The controlling unit 21 is implemented by running a main program of the image processing program of the invention. In this embodiment, when the image processing program is run, the examination ID and the series ID are provided as startup parameters serving as information for specifying the image data to be processed. Details will be described later with reference to FIG. 4.

The server interface 22 is a communication interface for communication with the image server 3, and includes an associated information obtaining unit 22*a*, an image data obtaining unit 22*b* and an analysis result sending unit 22*c*. Each of these processing units is implemented by running a subprogram invoked by the controlling unit 21. The server interface 22 controls communication of data with the image server 3 at an upper layer, such as the application level, and control of communication with the image server 3 at an lower layer, such as the network level, is achieved in cooperation with a network communication function, which is implemented by the operating system (including a network driver, and the like) of the image processing workstation 2.

As the address of the image server 3 on the network 19, the examination ID and the series ID are inputted to the associated information obtaining unit 22*a*, the associated information obtaining unit 22*a* sends to the image server 3 a message requesting to send the associated information (such as the number of slices and slice interval in this embodiment) associated with the examination ID and the series ID. Then, the associated information obtaining unit 22*a* receives the associated information sent from the image server 3, stores the received associated information in a predetermined memory region, and returns to the controlling unit 21 a message informing that the associated information has been obtained.

As the address of the image server 3 on the network 19, the examination ID, the series ID and the slice number are inputted to the image data obtaining unit 22*b*, the image data obtaining unit 22*b* sends to the image server 3 a message requesting to send the image data of the slice image associated with the examination ID, the series ID and the slice number. Then, the image data obtaining unit 22*b* receives the image data sent from the image server 3, stores the received image data in a predetermined memory region, and returns to the controlling unit 21 a message informing that the image data has been obtained. It should be noted that the associated information obtaining unit 22*a* may request to send the image ID of the image generated during a series of an examination identified by the inputted examination ID and the series ID, and the image data obtaining unit 22*b* may receive the image ID in stead of the slice number and may request to send the image data identified by the inputted examination ID, series ID and image ID.

As the address of the image server 3 on the network 19 and the result of the predetermined image analysis process carried out by the image processing workstation 2 are inputted to the analysis result sending unit 22*c*, the analysis result sending unit 22*c* sends the analysis result to the image server 3. Then, the analysis result sending unit 22*c* receives from the image server 3 a message informing that the analysis result has been registered (updated) in the image database 4, and returns the message to the controlling unit 21. The analysis result here contains the analysis results for all the slice images specified by the examination ID and the series ID provided at the startup of the image processing program, and may be in the form of an analysis result list (such as an array) containing the results associated with the respective slice numbers.

The image analysis unit 23 is implemented by running a subprogram invoked by the controlling unit 21. The image analysis unit 23 applies the predetermined image analysis process to image data of a single slice image inputted thereto, stores the result of the image analysis for the slice image in a predetermined memory region (for example, a storage region for storing the analysis result associated with the slice number of the inputted image data in the analysis result list containing the results associated with the respective slice numbers), and returns to the controlling unit 21 a message informing that the processing has been completed. The image analysis unit 23 may obtain further information necessary for switching between thresholds and/or lookup tables used in the image analysis process, such as the modality which has generated the inputted image data. A specific example of the image analysis process will be described later.

The image server 3 includes a client interface 31, an associated information searching unit 32, an image data searching unit 33 and an analysis result updating unit 34.

As the request message sent from the image processing workstation 2 is inputted to the client interface 31, the client interface 31 directs the request message to appropriate one of the associated information searching unit 32, the image data searching unit 33 and the analysis result updating unit 34 according to the content of the request message, and sends the result of operation by the associated information searching unit 32, the image data searching unit 33 or the analysis result updating unit 34 to the image processing workstation 2. It should be noted that the client interface 31 controls communication of data with the image processing workstation 2 at an upper layer, such as the application level, and control of communication with the image processing workstation 2 at an lower layer, such as the network level, is achieved in cooperation with a network communication function, which is implemented by the operating system (including a network driver, and the like) of the image server 3.

As a message requesting to send the associated information directed by the client interface 31 is inputted to the associated information searching unit 32, the associated information searching unit 32 uses the examination ID and the series ID contained in the message as search keys to search through the series information table 41a of the associated information database 41 to extract the associated information (such as the number of slices and the slice interval in this embodiment) associated with the examination ID and the series ID that match the search keys, and stores the associated information in a predetermined memory region. Then, the associated information searching unit 32 hands over to the client interface 31 the message requesting to send the associated information to the image processing workstation 2 which has sent the request.

As a message requesting to send the image data directed by the client interface 31 is inputted to the image data searching unit 33, the image data searching unit 33 uses the examination ID, the series ID and the slice number contained in the message as search keys to search through the slice information table 41b of the associated information database 41 to identify the file path name and the image ID associated with the examination ID, the series ID and the slice number that match the search keys. Then, the image data searching unit 33 reads in the image data specified by the image ID from a storage position of the image file 42 specified by the file path name, and stores the image data in a predetermined memory region. Then, The image data searching unit 33 hands over to the client interface 31 the message requesting to send the image data to the image processing workstation 2 which has sent the request. It should be noted that, in an embodiment in which the message requesting to send the image data contains the image ID, the search is carried out using the examination ID, the series ID and the image ID as the search keys to identify the file path name of the image data to be sent.

As the data containing the analysis result directed by the client interface 31 is inputted to the analysis result updating unit 34, the analysis result updating unit 34 updates the record of the analysis result, stored in the slice information table 41b of the associated information database 41, of the slice image specified by the examination ID, the series ID and the slice number contained in the data. Then, the analysis result updating unit 34 hands over to the client interface 31 a message requesting to send a message informing that the update has been completed to the image processing workstation 2 which has sent the analysis result.

Next, the flow of the process carried out by the image processing system according to one embodiment of the invention is described with reference to the flow chart of FIG. 4. The flow of the process is achieved by cooperation of operations carried out by the other processing units of the image processing workstation 2 and the processing units of the image server 3, based on control by the controlling unit 21 of the image processing workstation 2.

First, as the image processing program of the invention is started up on the image processing workstation 2, the controlling unit 21 obtains the examination ID and the series ID, which specify the image to be processed, from the startup parameter of the program.

Then, the controlling unit 21 invokes the associated information obtaining unit 22a to obtain the associated information, such as the number of slices and the slice interval, of the image taken during a series in an examination corresponding to the examination ID and the series ID, and the associated information obtaining unit 22a sends to the image server 3 a request to search for the associated information accordingly (#1). The client interface 31 of the image server 3 receives the request to search for the associated information sent from the image processing workstation 2 (#2), and hands over the request to search to the associated information searching unit 32. The associated information searching unit 32 searches through the series information table 41a of the associated information database 41 according to the request to search, and obtains the associated information corresponding to the examination ID and the series ID contained in the request to search (#3). Then, the client interface 31 sends the obtained associated information to the image processing workstation 2 (#4). The associated information obtaining unit 22a of the image processing workstation 2 receives the associated information sent thereto, stores the associated information in a predetermined memory region, and returns to the controlling unit 21 a message informing that the associated information has been obtained (#5).

The controlling unit 21 determines first image data to be processed by the image analysis unit 23, based on the obtained associated information (#6). Specifically, the controlling unit 21 specifies the slice number of the first image data to be processed. It should be noted that the image data to be processed determined by the controlling unit 21 at this time is not the image data of all the slice images associated with the examination ID and the series ID specifying the image to be processed, but the image data of some of the slice images.

The controlling unit 21 invokes the image data obtaining unit 22b to obtain the slice image data associated with the examination ID, the series ID and the slice number of the slice image to be processed, and the image data obtaining unit 22b sends to the image server 3 a request to search for the image data accordingly (#7). The client interface 31 of the image server 3 receives the request to search for the image data sent from the image processing workstation 2 (#8), and hands over the request to search to the image data searching unit 33. The image data searching unit 33 searches through the slice information table 41b of the associated information database 41 according to the request to search, and obtains the image data corresponding to the examination ID, the series ID and the slice number contained in the request to search (#9). Then, the client interface 31 sends the obtained image data to the image processing workstation 2 (#10). The image data obtaining unit 22b of the image processing workstation 2 receives the image data sent thereto, stores the image data in a predetermined memory region, and returns to the controlling unit 21 a message informing that the image data has been obtained (#11).

The controlling unit 21 invokes the image analysis unit 23 to apply image processing to the first image data to be processed. The image analysis unit 23 reads in the first image data to be processed from the memory region and applies the predetermined image analysis process to the image data. Then, the image analysis unit 23 stores the analysis result in a storage region for storing the analysis result associated with the slice number of the actually processed image data within a memory region in the form of the analysis result list containing the results associated with the respective slice numbers of all the slices image data to be processed, and returns to the controlling unit 21 a message informing that the processing has been completed (#12).

Based on the result of the analysis by image analysis unit 23, the controlling unit 21 determines whether or not it is possible to determine the image analysis result for all the slice image data associated with the examination ID and the series ID provided at the startup. If it is determined to be possible to determine the image analysis result, the image analysis result is determined for all the slice image data. If it is determined to be impossible to determine the image analysis result, a next image data to be processed is determined (#13). It should be noted that the image analysis result determined by the controlling unit 21 is also stored in a storage region for storing the analysis result corresponding to the slice number of the determined slice image within the memory region in the form of the analysis result list containing the results associated with the respective slice numbers, in which the above-described image analysis result by the image analysis unit 23 is stored. It should be noted that the content of this process depends on the content of the image analysis process, and therefore will be specifically described in the next section.

If it is determined that there is the next image data to be processed (#14: Yes), the controlling unit 21 invokes the image data obtaining unit 22*b* to obtain the slice image data associated with the examination ID, the series ID and the slice number of the next slice image to be processed determined in step #13. Thereafter, the above-described operations in steps #7 to #14 are repeated until the image analysis result is determined for all the slice image data to be processed and there is no next slice image data to be processed (#14: No).

If the image analysis result has been determined for all the slice image data to be processed (#14: No), the controlling unit 21 invokes the analysis result sending unit 22*c* to send to the image server 3 the analysis result stored in the memory region in the form of the analysis result list containing the results associated with the respective slice numbers, and the analysis result sending unit 22*c* sends the analysis result to the image server 3 accordingly (#15). The client interface 31 of the image server 3 receives the analysis result sent from the image processing workstation 2 (#16), and hands over the analysis result to the analysis result updating unit 34. The analysis result updating unit 34 carries out an update process to register the analysis result in an analysis result entry of the slice information table 41*b* (#17), and sends a message informing that the update has been completed to the image processing workstation 2 via the client interface 31 (#18). The analysis result sending unit 22*c* of the image processing workstation 2 receives the message (#19) and hands over the message to the controlling unit 21. Thus, the entire process has been completed.

Figure 5:
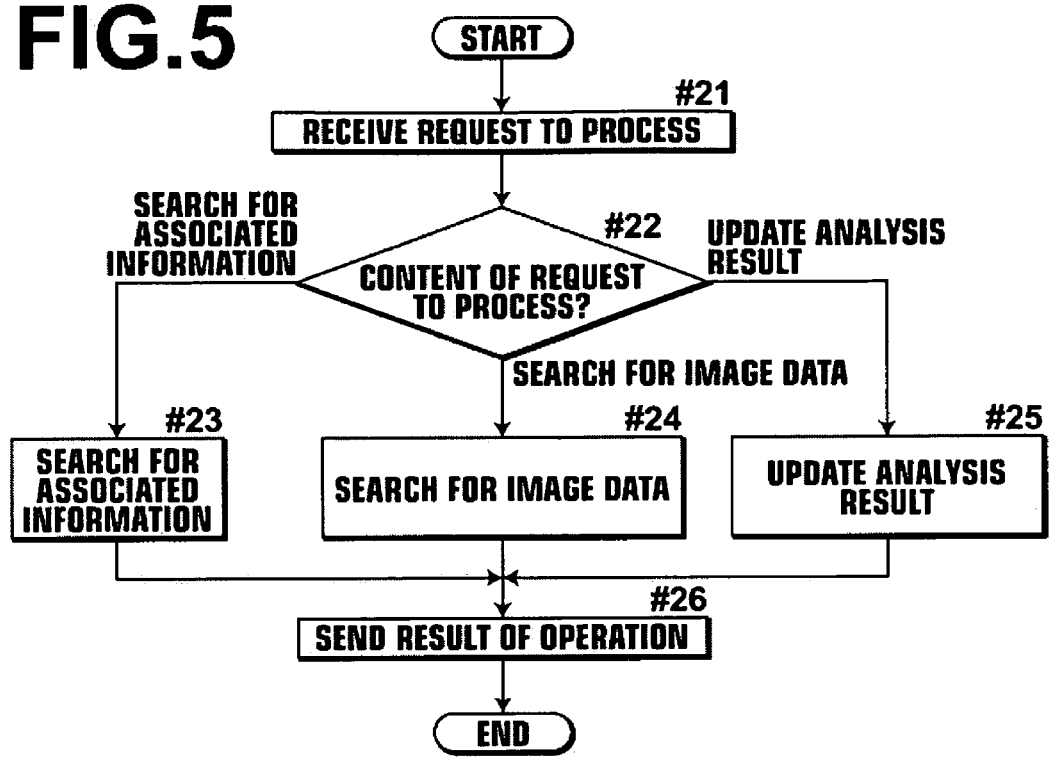
FIG. 5 is a flow chart illustrating the flow of a process carried out by an image processing server according to one embodiment of the invention, FIG. 6 schematically illustrates the outline of an imaged part recognition process.

FIG. 5 schematically illustrates the flow of the process carried out by the image server 3 in the above-described flow of the process. The client interface 31 waits for the request to process sent from the image processing workstation 2, and when the client interface 31 receives the request to process (#21), the client interface 31 directs the request to process to appropriate one of the associated information searching unit 32, the image data searching unit 33 and the analysis result updating unit 34 according to the content of the request to process (#22). The processing unit 32, 33 or 34 which has received the request to process carries out database processing according to the content of the request to process, and hands over the result of processing to the client interface 31 (#23, #24 or #25). Then, the client interface 31 sends the result of processing carried out at the processing unit 32, 33 or 34 to the image processing workstation 2 which has sent the request to process (#26). It should be noted that, at the image server 3, the client interface 31 and the processing units 32, 33 and 34 may be resident in a state of waiting for the request to process. Alternatively, the processing units 32, 33 and 34 may not be resident, and the client interface 31 may start up corresponding one of the processing units 32, 33 and 34 each time the request to process is received.

As described above, in the image processing system according to one embodiment of the invention, the controlling unit 21 on the image processing workstation 2 does not obtain the image data of all the slice images taken during a certain series in a certain examination to be processed from the image server 3, but obtains the image data of some of the slice images. Then, determination is made as to whether or not it is possible to determine the result of the image analysis for the image data of all the slice images to be processed based on the result of the image analysis applied by the image analysis unit 23 to the obtained image data. If it is determined to be impossible, the image analysis unit 23 determines the image data of the next slice image to be processed, and the next image data to be processed is obtained from the image server 3. The obtained image data is processed by the image analysis unit 23, and the above determination step is repeated based on the result of the image analysis including the newly obtained result. In contrast, if it is determined to be possible, no further image data of the slice image is obtained from the image server 3, and the result of the image analysis is determined (estimated) for the image data of all the slice images to be processed. Thus, the number of slice images necessary for obtaining the result of the image analysis for all the slice images to be processed is reduced, and the load of communication between the image server 3 and the image processing workstation 2 and the load of the image processing by the image processing workstation 2 are reduced, thereby improving the processing efficiency of the entire system.

2. Implementation Examples Of Specific Image Processing

Figure 4:
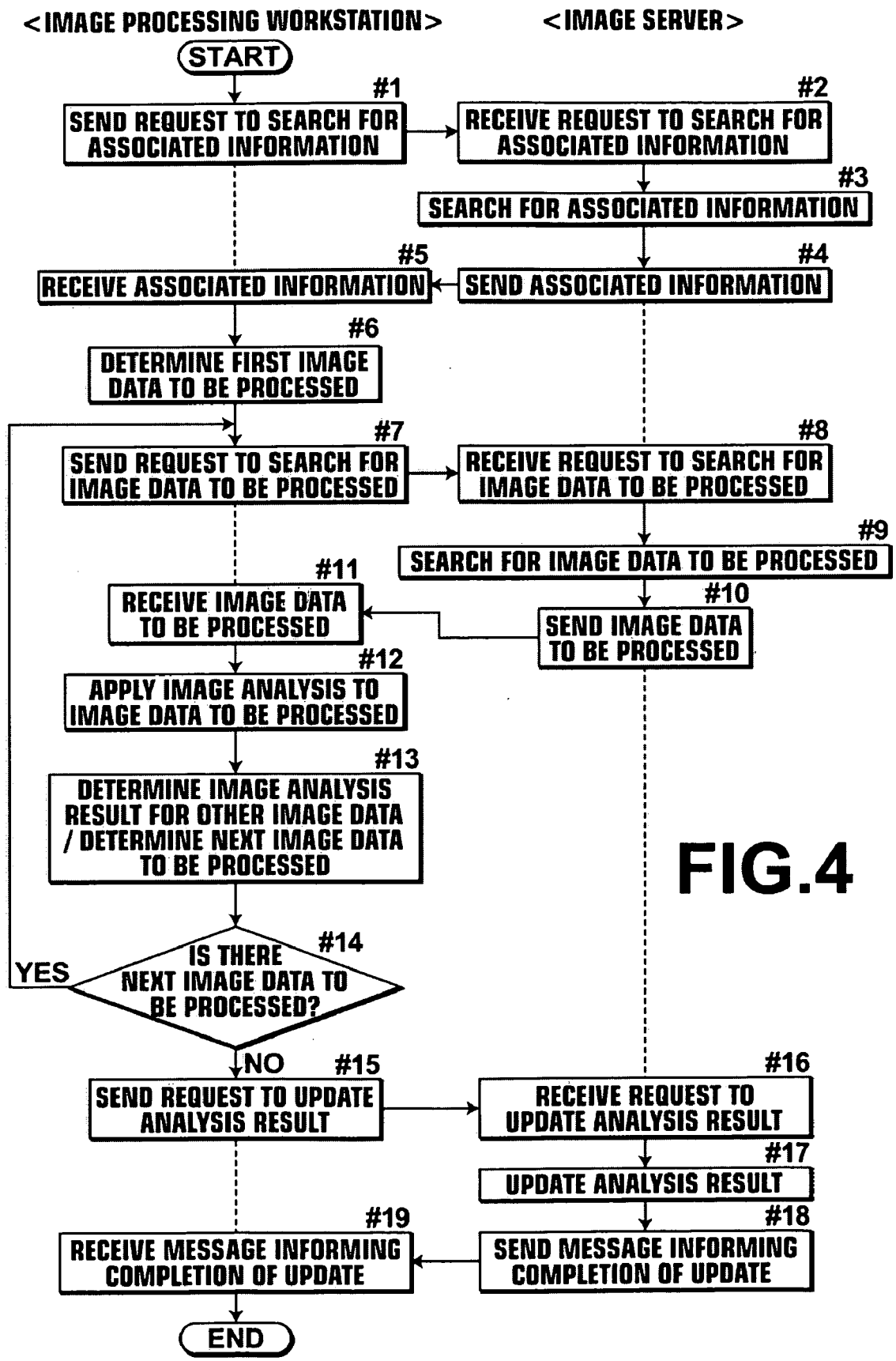
FIG. 4 is a flow chart illustrating the flow of a process carried out by the image processing system according to one embodiment of the invention.

Next, implementation examples of specific image processing implemented on the above-described image processing system are described, with focusing on the contents of the operations carried out at the image analysis unit 23, as well as the operations carried out at the controlling unit 21 to determine the image analysis result for unprocessed image data and to determine the next image data to be processed (step #13 in FIG. 4).

(1) Imaged Part Recognition Process

Figure 6:
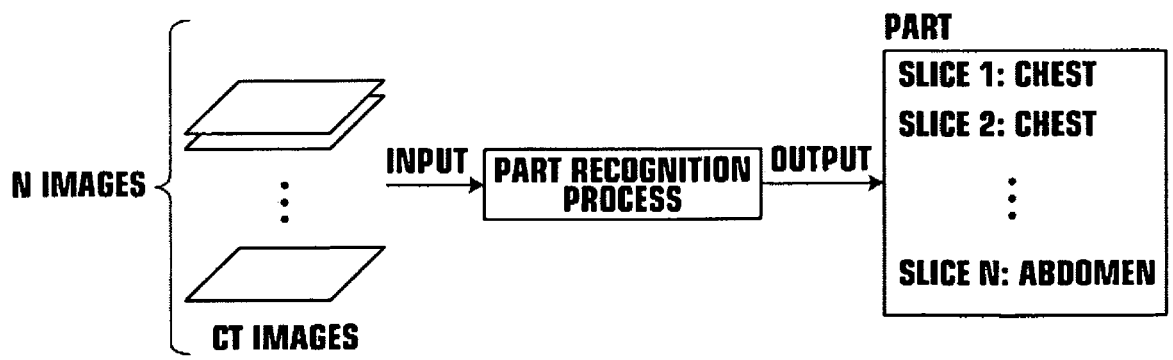

FIG. 6 schematically illustrates the outline of the imaged part recognition process. As shown in the drawing, the imaged part recognition process recognizes the part of the subject (imaged part) represented by each of slice images 1 to N, which have been taken with a CT apparatus. If the subject is a human body, the recognized imaged part may, for example, be the head part, the head-neck part, the neck part, the chest part, the chest-abdomen part, the abdomen part, the pelvis part, or the leg part.

FIG. 7 schematically illustrates details of the process for recognizing the imaged part represented by each slice image using an image analysis technique, that is, details of the imaged part recognition process implemented on the image analysis unit 23 in this embodiment. As shown in the drawing, the image analysis unit 23 includes: a normalization processing unit 23*a* that normalizes inputted slice images SL; a feature quantity calculation unit 23*b* that calculates a number of feature quantities $c_m$ (m=1, 2, . . . ) of the normalized slice images SN; a part score calculation unit 23*c* that calculates a score $sc_p$ (p=head part, head-neck part, neck part, chest part, chest-abdomen part, abdomen part, pelvis part or leg part) for each part, which indicates likelihood of the imaged part in each slice image representing the part, by inputting the feature quantities $c_m$ calculated based on the normalized slice images SN to classifiers obtained through AdaBoosting; and a part determination unit 23d that determines an imaged part P represented by each inputted slice image SL based on the calculated part scores $sc_p$.

The normalization processing unit 23a extracts a human body region from each inputted image SL, calculates landmarks (reference points) from information of the extracted human body region, and generates a normalized slice image SN by applying scaling, translation and/or rotation to the inputted image through Affine transform using the calculated landmarks as a reference. The purpose of the normalization is to eliminate variations in the size and inclination of the human body region in the inputted slice images SL arising from individual variability, imaging conditions, and the like, and to align the positions of structures (for example, a bone region or an air region) in the human body region, thereby improving efficiency and accuracy of the part recognition process that follows.

It should be noted that the human body region may be extracted from the inputted slice images SL by any of methods known at the time of practicing the present invention. For example, a method (see, for example, Japanese Unexamined Patent Publication No. 9 (1997)-187444) may be used, in which each inputted slice image SL is subjected to binarization and noise removal processing, and then, candidate contours for the human body region are extracted from the inputted slice image SL. Among the extracted candidate contours, those having an inner area that is smaller than a predetermined threshold are removed, and the inner area in the remaining contour candidate is determined as being the human body region.

Figure 8A:
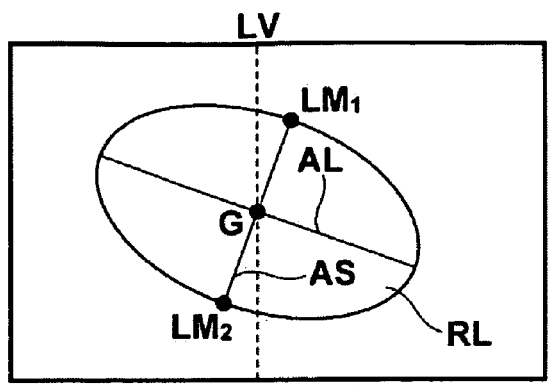
Figure 8B:
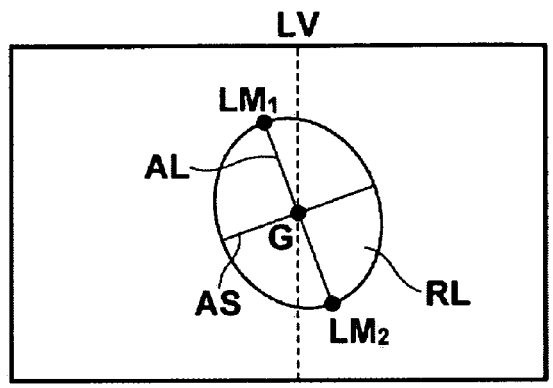
Figure 8C:
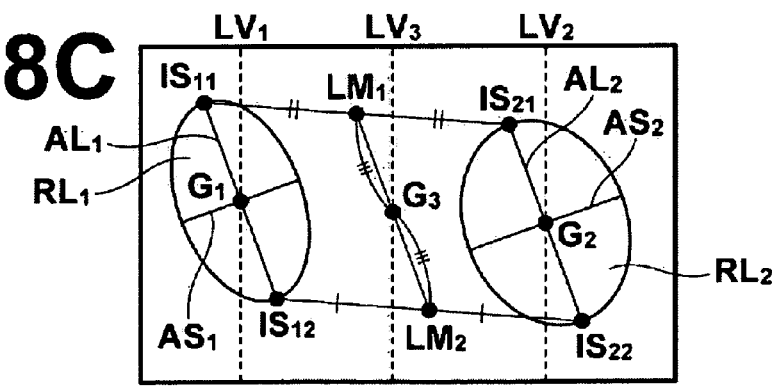
Figure 8D:
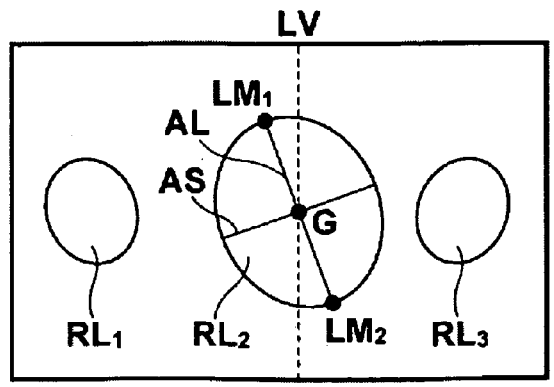

The landmarks may be two points at which the contour line intersects the median plane. More specifically, the landmarks can be found as shown in FIGS. 8A to 8D, depending on the number of labels obtained by labeling the extracted human body region(s). As shown in FIGS. 8A and 8B, if the number of labels is one, the gravity point G of the labeled region (human body region) RL is found. Then, a long axis AL and a short axis AS crossing the gravity point G, as well as a straight line LV crossing the gravity point G and extending in the vertical direction of the slice image SL are set. Then, points at which of one of the long axis AL and short axis AS, which forms a smaller angle with the straight line LV, intersects the contour line of the human body region RL are determined as landmarks $LM_1$ and $LM_2$. FIG. 8A schematically illustrates the case where the angle formed between the short axis AS and straight line LV is smaller than the angle formed between the long axis AL and straight line LV, and this case corresponds to an image representing the chest part, the chest-abdomen part, the abdomen part, or the pelvis part. FIG. 8B schematically illustrates the case where the angle formed between the long axis AL and straight line LV is smaller than the angle formed between the short axis AL and straight line LV, and this case corresponds to an image representing the head part, the head-neck part, or the neck part. FIG. 8C illustrates the case where the number of labels is two, and this case corresponds to an image representing the leg part. In this case, gravity points $G_1$ and $G_2$ are respectively found for the labeled regions $RL_1$ and $RL_2$. Then, long axes $AL_1, AL_2$ and short axes $AS_1, AS_2$ crossing the gravity points $G_1$ and $G_2$, respectively, and straight lines $LV_1, LV_2$ crossing the gravity points $G_1$ and $G_2$ respectively and extending in the vertical direction of the slice image SL are set. For each labeled region, points at which one of the long axis ($AL_1$, $AL_2$) and short axis ($AS_1$, $AS_2$), which forms a smaller angle with the straight line ($LV_1, LV_2$), intersects the labeled region ($RL_1$, $RL_2$) are determined ($IS_{11}$ and $IS_{12}$, $IS_{21}$ and $IS_{22}$). Then, midpoints of line segments $IS_{11}$-$IS_{21}$ and $IS_{12}$-$IS_{22}$, which do not cross each other, are set as landmarks $LM_1$, $LM_2$. It should be noted that, if the area ratio between the two labeled regions is not within a predetermined range, that is, if the difference in area between the two labeled regions is greater than a predetermined threshold, the smaller labeled region is determined as being a medical appliance or the like, and the same processing as that of the case where the number of labels is one is carried out. FIG. 8D illustrates the case where the number of labels is three, and this case corresponds to an image representing the neck part and arms. In this case, the same processing as that of the case where the number of labels is one is applied to one of the labeled regions $RL_1$, $RL_2$ and $RL_3$, which has the largest area ($R_{12}$ in this case), to obtain landmarks $LM_1$ and $LM_2$. It should be noted that, in FIGS. 8A, 8B and 8D, if the distance from the straight line LV to each of the landmarks $LM_1$ and $LM_2$ is greater than a predetermined threshold, correction may be performed to shift the positions of the landmarks $LM_1$ and $LM_2$ closer to the straight line LV along the contour of the labeled area RL. Similarly, in FIG. 8C, if the distance from the straight line $LV_3$, which crosses the midpoint $G_3$ of the line segments $IS_{11}$-$IS_{21}$ and $IS_{12}$-$IS_{22}$ and extends in the vertical direction of the slice image SL, to each of the landmarks $LM_1$ and $LM_2$ is greater than a predetermined threshold, correction may be performed to shift the positions of the landmarks $LM_1$ and $LM_2$ closer to the straight line $LV_3$ along the line segments $IS_{11}$-$IS_{21}$ and $IS_{12}$-$IS_{22}$. A specific example of the shift amount may be such that shifting the landmarks $LM_1$ and $LM_2$ reduces the distance from the straight line LV or $LV_3$ to each of the landmarks $LM_1$ and $LM_2$ by 20%.

Using the thus obtained landmarks $LM_1$ and $LM_2$ as the reference, Affine transform, or the like, is applied to each slice image SL to normalize the slice image such that the two landmarks $LM_1$ and $LM_2$ are located in the horizontal center of the image and the distance between the landmarks $LM_1$ and $LM_2$ has a predetermined value.

The feature quantity calculation unit 23b calculates many types of feature quantities $c_m$ from each of the normalized slice images SN. Specific examples of the feature quantities $c_m$ include pixel values, or the average, maximum, minimum or median value of the pixel values of pixels in a block (such as a block of 3×3 pixels) set within the normalized slice image SN, a ratio of the air region or the bone region in the human body region, which is extracted through thresholding based on CT values, to the human body region, and an area ratio of the human body region to a circle having the same perimeter as the human body region (circularity). It should be noted that the feature quantities $c_{nm}$ may be calculated values without any further conversion or multinarized values thereof.

The part score calculation unit 23c calculates the part score $sc_p$ for each part, which indicates likelihood of the imaged part in each slice image representing the part, by inputting the feature quantities $c_m$ to a group of classifiers prepared for each part through a learning process based on AdaBoosting. The learning process based on AdaBoosting used for generating the group of classifiers for each part uses many types of feature quantities that are calculated as described above from a plurality of images serving as training samples which are known in advance to represent the particular part, and a plurality of images which are known in advance not to represent the part. The group of classifiers corresponding to one part includes one or more classifiers. If two or more classifiers are included in a group, they have a complementary relationship in classification capability. The numbers of classifier groups to be generated is the same as the number of parts to be classified, and the types of feature quantities to be used are determined for each classifier group. Details of the learning process and the calculation of the part score are disclosed in Japanese Unexamined Patent Publication No. 2005-108195. Besides the part score calculation method described above, the part score may be calculated using classifiers generated by any of other machine learning techniques, such as artificial neural network (ANN), support vector machine (SVM), or relevance vector machine (RVM), or may be calculated using a lookup table that determines a part score for a feature quantity or a combination of feature quantities (see, for example, Japanese Unexamined Patent Publication No. 2007-307205). The operations carried out by the feature quantity calculation unit 23b and the part score calculation unit 23c may be replaced with operations to obtain a degree of similarity, which serves as the part score, through template matching (see, for example, Japanese Unexamined Patent Publication No. 2002-253539) or comparison with a unique feature image prepared for each part (see, for example, Japanese Unexamined Patent Publication No. 2003-010166).

The part determination unit 23d determines the imaged part P represented by the inputted slice image as the part having the greatest part score $sc_p$.

Figure 9A:
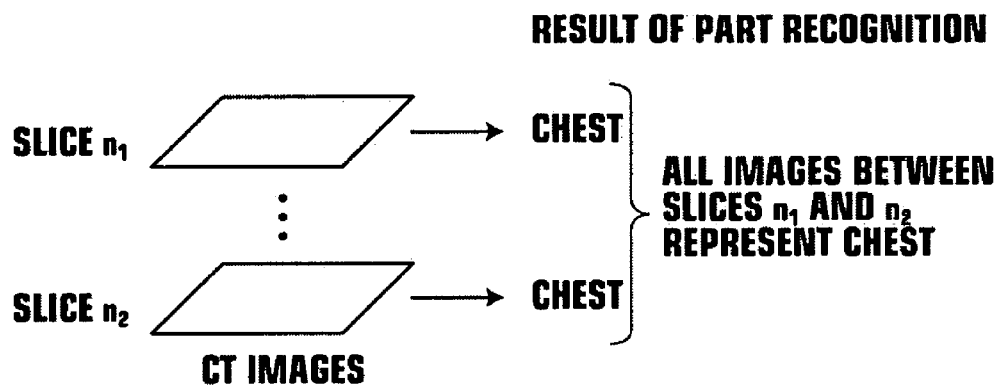
Figure 9B:
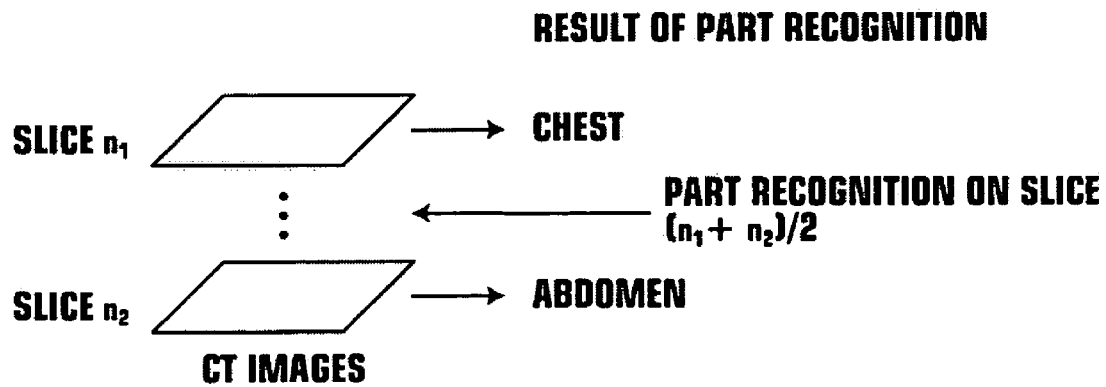

By applying the operation carried out by the image analysis unit 23 to each slice image data to be processed, the imaged part represented by each slice image to be processed can be determined. However, since the body parts of a human body is arranged in the anatomically fixed order, i.e., the head part, the head-neck part, the neck part, the chest part, the chest-abdomen part, the abdomen part, the pelvis part and the leg part from the top, if any two slice images represent the same imaged part, it can be determined that the slice images between the two slice images also represent the same imaged part, without the need of the image analysis unit 23 applying the above-described operation to all the slice images to be processed. This fact is schematically illustrated in FIG. 9A. As shown in the drawing, if the imaged part represented by both of slice images $n_1$ and $n_2$ is the chest part, the imaged part represented by any slice image between the slice images $n_1$ and $n_2$ can be determined (estimated) as being the chest part, without need of applying the above-described operation by the image analysis unit 23. In contrast, as shown in FIG. 9B, if the two slice images $n_1$ and $n_2$ represent different imaged parts from each other, such as the chest part and the abdomen part, there should be at least one boundary between the different imaged parts represented by the two slice images. Therefore, it is necessary to find the boundary through the above-described operation by the image analysis unit 23.

Therefore, a first implementation example of the imaged part recognition process adopts a concept of binary tree search, in which the operation by the image analysis unit 23 can be skipped when it is not necessary (see FIG. 9A), and the controlling unit 21 determines the result of the image analysis for the unprocessed image data and determines the next image data to be processed (in step #13 of FIG. 4). Specifically, as shown in FIG. 9A, if the slice images $n_1$ and $n_2$ represent the same imaged part, it is determined that the imaged part represented by any slice image between the slice images $n_1$ and $n_2$ is the same imaged part as that represented by the slice images $n_1$ and $n_2$. In contrast, as shown in FIG. 9B, if the two slice images $n_1$ and $n_2$ represent different imaged parts, the operation by the image analysis unit 23 is applied to a slice image at the middle between the slice images $n_1$ and $n_2$ (($n_1$+ $n_2$)/2), and this operation is repeated to identify the boundary between the different imaged parts.

For example, as shown in FIG. 10, if 16 slice images are to be processed, the image analysis unit 23 on the image processing workstation 2 recognizes the imaged part represented by the image data of each of the slice images 1and 16, which are present at opposite ends of the slice images to be processed. As a result, it is found that the imaged part (chest part) of the slice image 1 and the imaged part (abdomen part) of the slice image 16 are different from each other. Then, the controlling unit 21 determines the image data of the slice image 8 at the middle between the slice images 1 and 16 as the next image data to be processed by the image analysis unit 23, and the image analysis unit 23 recognizes the imaged part of the slice image 8 as being the chest-abdomen part. Then, the controlling unit 21 divides the entire slice images to be processed into two blocks, and compares the imaged parts of the slice images 1 and 8, which are at the opposite ends of the block of slice images 1 to 8, with each other, and the imaged parts of the slice images 8 and 16, which are at the opposite ends of the block of slice images 1 to 16, with each other. As a result, it is found that the slice images at the apposite ends of either of the blocks represent different imaged parts. Then, the image data of the slice image at the middle of each block, namely, the image data of the slice image 4 in the former block and the image data of the slice image 12 in the latter block are determined as the next image data to be processed by the image analysis unit 23. The image analysis unit 23 processes the image data of each of the slice images 4 and 12, and recognizes the imaged part of the slice image 4 as being the chest part, and the imaged part of the slice image 12 and being the abdomen part. Then, the controlling unit 21 divides each block in the same manner as described above, and compares the imaged parts of the slice images at the opposite ends of the block with each other. As a result, it is found that the slice images 1 and 4 at the opposite ends of the block of the slice images 1 to 4 represent the chest part, i.e., the same imaged part, and therefore, it is determined that the slice images 2 and 3 between the slice images 1 and 4 also represent the chest part. Similarly, the slice images 12 and 16 at the opposite ends of the block of the slice images 12 to 16 represent the abdomen part, i.e., the same imaged part, and therefore, it is determined that the slice images 13 to 15 between the slice images 12 and 16 also represent the abdomen part. On the other hand, for the block of the slice images 4 to 8 and the block of the slice images 8 to 12, the slice images at the opposite ends of the block represent different imaged parts from each other. Therefore, the controlling unit 21 determines the image data of the slice image 6 and the image data of the slice image 10, which are at the middle of these blocks, as the next image data to be processed by the image analysis unit 23. Then, the image analysis unit 23 recognizes the imaged part of the slice image 6 as being the chest part and the imaged part of the slice image 10 as being the chest-abdomen part. Then, the controlling unit 21 further divides the block of the slice images 4 to 8 and the block of the slice images 8 to 12 into smaller blocks, and compares the imaged parts of the slice images at the opposite ends of each block with each other. As a result, it is found that the slice images 4 and 6 at the opposite ends of the block of the slice images 4 to 6 represent the chest part, i.e., the same imaged part, and therefore, it is determined that the slice image 5 between the slice images 4 and 6 also represent the chest part. Similarly, it is found that the slice images 8 and 10 at the opposite ends of the block of the slice images 8 to 10 represent the chest-abdomen part, i.e., the same imaged part, and therefore, it is determined that the slice image 9 between the slice images 8 and 10 also represents the chest-abdomen part. On the other hand, for the block of slice images 6 to 8 and the block of the slice images 10 to 12, the slice images at the opposite ends of the block represent different imaged parts from each other. Therefore, the controlling unit 21 determines the image data of the slice image 7 and the image data of the slice image 11, which are at the middle of these blocks, as the next image data to be processed by the image analysis unit 23, and the image analysis unit 23 recognizes the imaged parts of the slice images 7 and 11 as being the chest part and the abdomen part, respectively. In this manner, the imaged part is determined for all the 16 slice images.

In FIG. 10, the imaged parts of the slice images determined by the controlling unit 21, i.e., not by the image analysis unit 23, are indicated with an arrow. As shown in the drawing, in this example, the load of transfer of the image data from the image server 3 to the image processing workstation 2 and the load of processing by the image analysis unit 23 on the image processing workstation 2 are reduced for seven images of the 16 slice images.

FIGS. 11A and 11B illustrate one example of the flow chart that implements the operations of step #13 in FIG. 4 carried out by the controlling unit 21, i.e., the operations to determine the result of the image analysis for unprocessed image data and to determine the next image data to be processed. Now, points of the flow of the imaged part recognition process in this implementation example, which have not been described in the above-described basic flow of the process, are described also with reference to the flow chart of FIG. 4. It should be noted that variables shown in FIGS. 11A and 11B store the following information.

Current_No: the slice number of the current or next slice image to be processed;

Current_Result: the imaged part of the slice image of the Current_No;

Top_No: the slice number of the slice image at the upper end of the block divided at the slice position of the Current_No;

Top_Result: the imaged part of the slice image of the Top_No;

Bottom_No: the slice number of the slice image at the bottom end of the block divided at the slice position of the Current_No; and Bottom_Result: the imaged part of the slice image of the Bottom_No.

The Current_No is a variable that can be referenced also by the image data obtaining unit 22*b* and the image analysis unit 23, and the part recognized by the image analysis unit 23 is written at the Current_Result.

As the image processing program for carrying out the imaged part recognition process of this implementation example is started up, the value of the Current_No is initialized to "1". Thus, in step #6 of FIG. 4, the image data of the slice number 1 representing the slice image at the upper end of the slice images to be processed is determined as the first image data to be processed. Further, in step #13 of FIG. 4, the slice number 1 stored at the Current_No is stored at the Top No, and the result of processing applied by the image analysis unit 23 to the slice image of the slice number 1 stored at the Current_Result is stored at the Top_Result by the controlling unit 21 (#31: left and #32). Then, the maximum value is assigned to the Current_No, and the image data of the slice image at the bottom end of the slice images to be processed is determined as the next image data to be processed (#33). It should be noted that the maximum value assigned to the Current_No is obtained by referencing the number of obtained slices ("16" in the example shown in FIG. 10) obtained by the associated information obtaining unit 22*a*. Then, the slice number of the image data of the slice image at the bottom end and the result of processing by the image analysis unit 23 are stored at the Bottom_No and the Bottom_Result, respectively (#31: right and #34). If the slice image at the upper end and the slice image at the bottom end represent the same imaged part (#35: Yes), it is determined that all the slice images to be processed represent the same imaged part (#36), and all the result determination flags are set to "Y" to indicate that there is no next image data to be processed. If the slice image at the upper end and the slice image at the bottom end represent different imaged parts from each other (#35: No), the slice number of the slice image at the middle of the current block to be determined by the controlling unit 21, which is calculated by (Top_No+Bottom_No)/2, is assigned to the Current_No to indicate the next image data to be processed (#46). Then, the operations in steps #7 to #12 in FIG. 4 are carried out, and the result of processing by the image analysis unit 23 for the slice image of the Current_No is stored at the Current_Result.

Subsequently, the controlling unit 21 compares the Top_Result of the imaged part of the slice image at the upper end of the block with the Current_Result of the imaged part of the slice image at the middle of the block, and if they are the same (#31: down, #38: Yes), it is determined that the slice images from the upper end to the middle of the block represent the same imaged part (#39). Since the slice image at the upper end and the slice image at the bottom end of the current block to be determined represent different imaged parts from each other, there should be a boundary between the different imaged parts within the block. In this example, since there is no boundary between the slice image at the upper end and the slice image at the middle, the block of the slice images from the middle to the bottom end of the current block is set as a new block to be determined (#41), and the slice number of the slice image at the middle of the new block is assigned to the Current_No to indicate the next image data to be processed (#46).

In contrast, if the Top_Result of the imaged part of the slice image at the upper end and the Current_Result of the imaged part of the slice image at the middle of the current block are different from each other (#38: No), the Current_Result of the imaged part of the slice image at the middle is compared with the Bottom_Result of the imaged part of the slice image at the bottom end of the block. If they are the same with each other (#47: Yes), it is determined that the slice images from the middle to the bottom end of the block represent the same imaged part (#48). In this case, the boundary between the different imaged parts should be present between the slice image at the upper end and the slice image at the middle. Therefore, the block of slice images from the upper end to the middle of the current block is set as a new block to be determined (#50), and the slice number of the slice image at the middle of the new block is assigned to the Current_No to indicate the next image data to be processed (#46).

Further, if the Current_Result of the imaged part of the slice image at the middle and the Bottom_Result of the imaged part of the slice image at the bottom end are different from each other (#47: No), the boundary between the different imaged parts should be present between the slice image at the upper end and the slice image at the middle of the current block and between the slice image at the middle and the slice image at the bottom end of the current block. Therefore, it is necessary to search for the boundary from slice images at the both sides of the slice image at the middle of the block. Since it is impossible to simultaneously process the slice images at the both sides, the controlling unit 21 puts priority on the search for the boundary at the upper side in this implementation example, and determines the upper half of the current block as the next block to be determined (#47: No to #50) and assigns the slice number of the slice image at the middle of the next block to the Current_No to indicate the next image data to be processed (#46). On the other hand, with respect to the lower half of the current block, from which another boundary should be searched for (hereinafter referred to as an "unprocessed block"), information of top and bottom ends of the unprocessed block are temporarily stored at stack variables: Save_Top_No[i], Save_Top_Result[i], Save_Bottom No[i] and Save_Bottom_Result[i] (#53). It should be noted that "i" is a suffix, and when there are more than one unprocessed blocks, the suffix "i" is sequentially incremented (#52).

Next, a process that is carried out when the boundary between different imaged parts has been found is described. First, if the boundary has been found between the slice image at the upper end of the current block and the slice image at the middle of the current block (#49: Yes), there is no boundary between the different imaged parts in slice images positioned above the slice image at the upper end of the block since the process of this implementation example puts priority on the search for the upper boundary, as described above. Therefore, the controlling unit 21 obtains information of the block which has been temporarily stored as the unprocessed block, sets the block as a new block to be determined (#44, #45), and assigns the slice number of the slice image at the middle of the new block to the Current_No to indicate the next image data to be processed (#46).

In contrast, if the boundary is present between the slice image at the middle and the slice image at the bottom end of the current block (#40: Yes, #51: Yes), and the boundary between the different imaged parts has not been found from the slice images positioned above the slice image at the middle (#51: Yes to #49: No), the block of the slice images from the upper end to the middle of the current block is set as a new block to be determined (#50), and the slice number of the slice image at the middle of the new block is assigned to the Current_No to indicate the next image data to be processed (#46). On the other hand, if the boundary between the different imaged parts is not present in the slice images above the slice image at the middle of the block (#38: Yes to #40: Yes, #51: Yes to #49: No), the controlling unit 21 obtains information of the block which has been temporarily stored as the unprocessed block to set the block as a new block to be determined (#44), and assigns the slice number of the slice image at the middle of the new block to the Current_No to indicate the next object to be processed (#46).

When there is no unprocessed block remaining after the above-described operations have been repeated (#42: Yes), this means that the imaged part has been determined for all the slice images to be processed. Therefore, all the result determination flags are set to "Y" to indicate that there is no next object to be processed (#43).

If all the result determination flags are set to "Y", the controlling unit 21 determines in step #14 of FIG. 4 that there is no next image data to be processed, and operations in step #16 and the following steps are carried out.

Next, a second implementation example of the imaged part recognition process is described. FIG. 12 schematically illustrates one example of the process of this implementation example. In this example, first, some of the 16 slice images are skipped at a predetermined rate during the processing by the image analysis unit 23 to recognize the imaged part represented by these slice images. A block $BLK_{120}$ shows a result of the imaged part recognition, which is obtained by applying the process to every three slice images, namely, to the slice images having the slice numbers 1, 4, 7, 10, 13 and 16. Then, the slice images of the block $BLK_{120}$ are divided into five blocks $BLK_{121}$ to $BLK_{125}$, with using the slice images processed by the image analysis unit 23 as boundaries. For each block, if the slice image at the upper end and the slice image at the bottom end represent the same imaged part, it is determined that all the slices images of the block represents the same imaged part (blocks $BLK_{121}$, $BLK_{122}$ and $BLK_{125}$). In contrast, if the slice image at upper end and the slice image at the bottom end represent different imaged parts, the image analysis unit 23 processes the slice images of the block other than the slice images at the top and bottom ends of the block to recognize the imaged represented by each slice image (blocks $BLK_{123}$ and $BLK_{124}$).

In FIG. 12, the imaged parts of the slice images determined by the controlling unit 21, i.e., not by the image analysis unit 23, are indicated with an arrow. As shown in the drawing, in this example, the load of transfer of the image data from the image server 3 to the image processing workstation 2 and the load of processing by the image analysis unit 23 on the image processing workstation 2 are reduced for six images of the 16 slice images.

It should be noted that the number of skipped slice images when determining the first slice images to be processed by the image analysis unit 23, shown in the block $BLK_{120}$ of FIG. 12, is preferably an integer value smaller than the value obtained by the following equation:

(The minimum value of the length of the imaged part in the body axis direction)/(The slice interval of the slice images to be processed)   Eq. 1.

The minimum value of the length of the imaged part in the body axis direction can be statistically found in advance. The slice interval of the slice images to be processed can be obtained by the associated information obtaining unit 22a. If the number of skipped slice images is greater than the integer value obtained by Eq. 1, possibility of the slice images at the upper end and the bottom end of each divided block representing different imaged parts is increased, and this will lower the effect of the first skipping of the slice images.

Figure 13A:
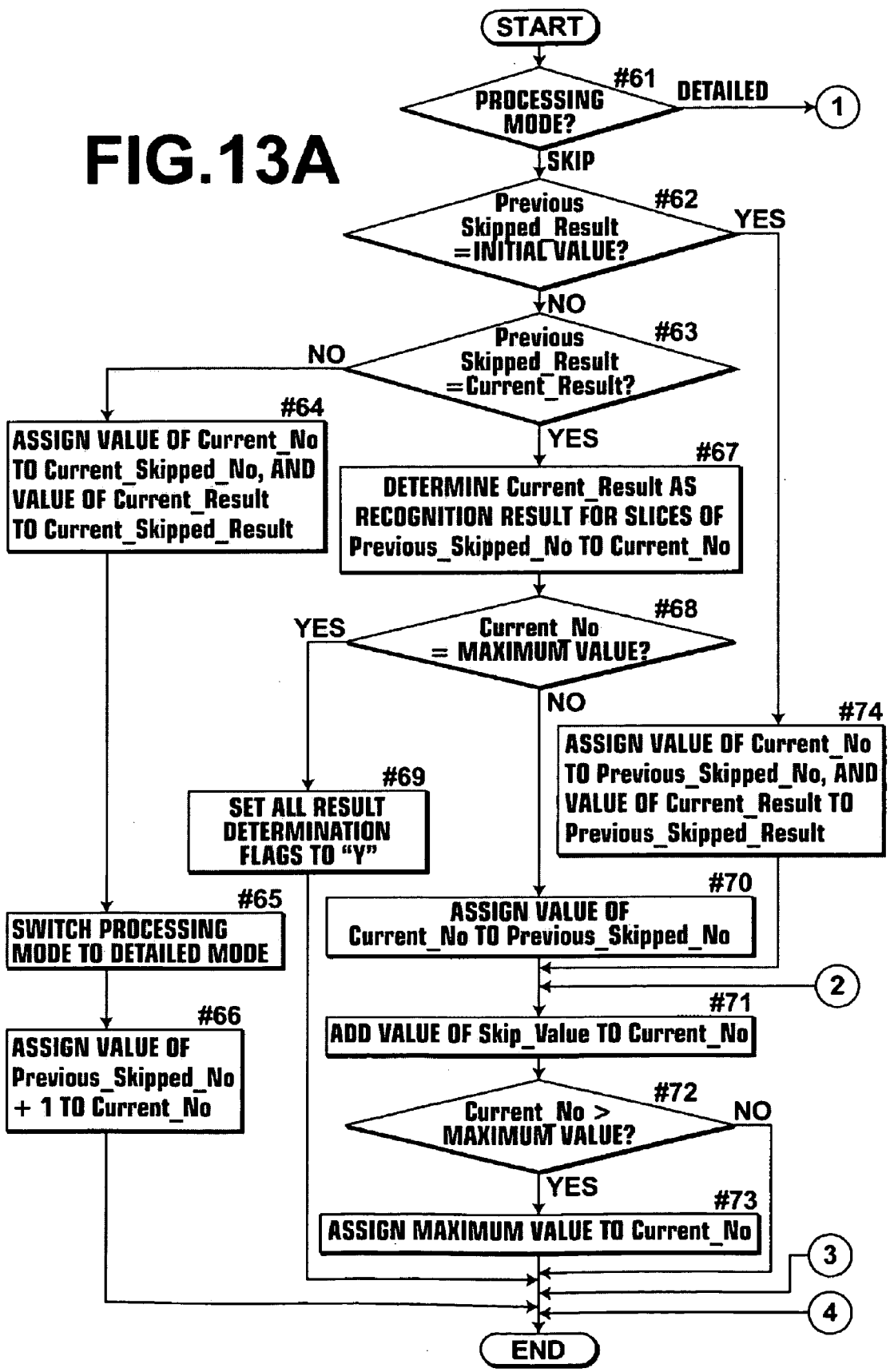
FIG. 13A is a flow chart of the second implementation example of the imaged part recognition process carried out in the image processing system of the invention.

FIGS. 13A and 13B illustrate one example of the flow chart that implements the operations of step #13 in FIG. 4 of the second implementation example carried out by the controlling unit 21, i.e., the operations to determine the result of the image analysis for unprocessed image data and to determine the next image data to be processed. In this example, the variables Current_No and Current_Result store the same information as those of the first implementation example.

This implementation example includes two processing modes: a skip mode for determining the next slice image to be processed by the image analysis unit 23 with skipping some of the slice images; and a detailed mode for determining each adjacent slice image as the next slice image to be processed by the image analysis unit 23 without skipping any slice image (#61). It should be noted that the number of skipped slice images during the skip mode is determined according to Eq. 1 from the minimum value of the length of the imaged part in the body axis direction, which is defined in advance in the configuration file, and the slice interval of the slice images to be processed obtained by the associated information obtaining unit 22a, and is stored at a variable Skip_Value. Further, when the program implementing this process is started up, the Current_No is initialized to "1" and the processing mode is initialized to the skip mode.

Basically, the controlling unit 21 controls, in the skip mode, the image analysis unit 23 to recognize the imaged part of each of two slice images which are apart from each other by the value of the Skip_Value, and stores the slice number of the slice image which is processed first at the Previous_Skipped_No and the recognized imaged part of the slice image at the Previous_Skipped_Result (#74). Then, the controlling unit 21 compares the imaged part of the first-processed slice image (Previous_Skipped_Result) with the imaged part of the later-processed slice image (Current_Result) (#63). If these slice images represent the same imaged part (#63: Yes), it is determined that all the slice images between these slice images represent the same imaged part (#67). Then, the value at the Previous_Skipped_No is updated to the slice number of the later-processed slice image (i.e., the value at the Current_No) (#70). Further, still in the skip mode, the slice number of the next slice image to be processed which is apart from the current slice image by the value of the Skip_Value is determined and is assigned to the Current_No (#71). In contrast, if these slice images represent different imaged parts from each other (#63: No), the slice number of the later-processed slice image (i.e., the value at the Current_No) is stored at the Current_Skipped_No and the imaged part of the later-processed slice image (i.e., the value at the Current_Result) is stored at the Current_Skipped_Result (#64). Then, the processing mode is switched to the detailed mode (#65), and the slice numbers of all the slice images between the slice images processed in the skip mode are sequentially assigned to the Current_No as the slice number of the next slice image to be processed (#66, #61: details, #75 to #76: No). When the imaged part has been recognized by the image analysis unit 23 for all the slice images between the slice images processed in the skip mode (#76: Yes), the values of the Previous_Skipped No and the Previous_Skipped_Result are updated to the values of the Current_Skipped_No and the Current_Skipped_Result, respectively (#78), the processing mode is switched to the skip mode (#79), and the slice number of the next slice image to be processed, which is apart from the current slice image by the value of the Skip_Value, is determined and assigned to the Current_No (#71).

As described above, the controlling unit 21 determines, for each skip, whether or not it is possible to determine the imaged part for the unprocessed slice images in the skipped zone (#63). If it is determined to be possible to determine the image analysis result (#63: Yes), the imaged part is determined for the slice images in the skipped zone (#67), and another skip is made (#71). If it is determined to be impossible to determine the image analysis result (#63: No), the image analysis unit 23 recognizes the imaged part for all the slices images in the skipped zone (#65, #66, #61: details, #75 to #76: No). When the imaged part has been recognized for all the slices in the skipped zone (#76: Yes), another skip beyond the next zone (#78, #79 and #71) is repeated. Finally, when the imaged part has been determined for all the slice images (#68: Yes, #77: Yes), all the result determination flags are set to "Y" to indicate that there is no next image data to be processed (#69, #80).

It should be noted that, if the slice number of the next slice image to be processed set by the skip exceeds the maximum value of the slice number of the slice images to be processed (#72: Yes), the maximum value is written as the slice number of the next slice image to be processed (#73).

(2) Lesion Candidate Detection Process

Next, an implementation example of a process to detect a lesion candidate from the slice images implemented on the image processing system of the invention is described. In this implementation example, the process to detect a lesion candidate through the image analysis applied to the slice images by the image analysis unit 23 can be achieved by using any of known methods, such as a method using template matching (see, for example, Japanese Unexamined Patent Publication No. 2003-265463).

Also in this implementation example, the image analysis can be applied to all the slice images to be processed to detect a lesion candidate from each slice image. However, considering the size of a lesion to be detected, even if the image analysis is carry out with some of the slice images being skipped at an interval that is slightly smaller than the minimum value of the possible size of the lesion, the lesion having a size greater than the minimum value can reliably be detected. Further, when a lesion is detected, it is highly possible that the lesion is also detected from the slice images adjacent to the slice image from which the lesion has been detected. Therefore, for these adjacent slice images, it is preferable to individually apply the image analysis to detect the lesion candidate.

FIG. 14 schematically illustrates a first implementation example of a lesion candidate detection process based on the above-described concept. In this example, first, some of 30 slice images to be processed are skipped at a predetermined rate during the processing by the image analysis unit 23 to detect the lesion candidate. A detection result $RST_{141}$ in FIG. 14 shows a result of the lesion candidate detection by the image analysis unit 23, which is obtained by applying the process to every ten slice images, namely, to the slice images of the slice numbers 1, 11, 21 and 30. As the result of this process, the lesion candidate is detected only from the slice image of the slice number 11. Therefore, as shown in a detection result $RST_{142}$ in FIG. 14, the lesion candidate detection through the processing by the image analysis unit 23 is applied to adjacent slice images on the both sides of the slice image of the slice number 11, one by one in the direction away from the slice image of the slice number 11. When slice images which contain no detected lesion candidate are found (the slice images of slice numbers 7 and 13 in the detection result $RST_{142}$ in FIG. 14), the processing by the image analysis unit 23 applied to the slice images adjacent to the slice image of the slice number 11 ends. For slice images which has not been subjected to the processing by the image analysis unit 23 at this point of time, it can be determined, from the lesion candidate detection result which has been obtained so far, that no lesion candidate will be detected from these slice images, without applying the processing by the image analysis unit 23 to these slice images.

In FIG. 14, the detection results for the slice images which have been determined that no lesion candidate will be detected therefrom without being processed by the image analysis unit 23 are indicated with an arrow. As shown in the drawing, in this example, the load of transfer of the image data from the image server 3 to the image processing workstation 2 and the load of processing by the image analysis unit 23 on the image processing workstation 2 are reduced for 20 images of the 30 slice images.

It should be noted that the number of skipped slice images when determining the first slice images to be processed by the image analysis unit 23, shown in the detection result $RST_{141}$ of FIG. 14, is an integer value smaller than the value obtained by the following equation:

(The minimum value of the size of the lesion to be detected)/(The slice interval of the slice images to be processed)      Eq. 2.

The minimum value of the size of the lesion to be detected can be statistically found in advance. The slice interval of the slice images to be processed can be obtained by the associated information obtaining unit 22a.

Figure 15B:
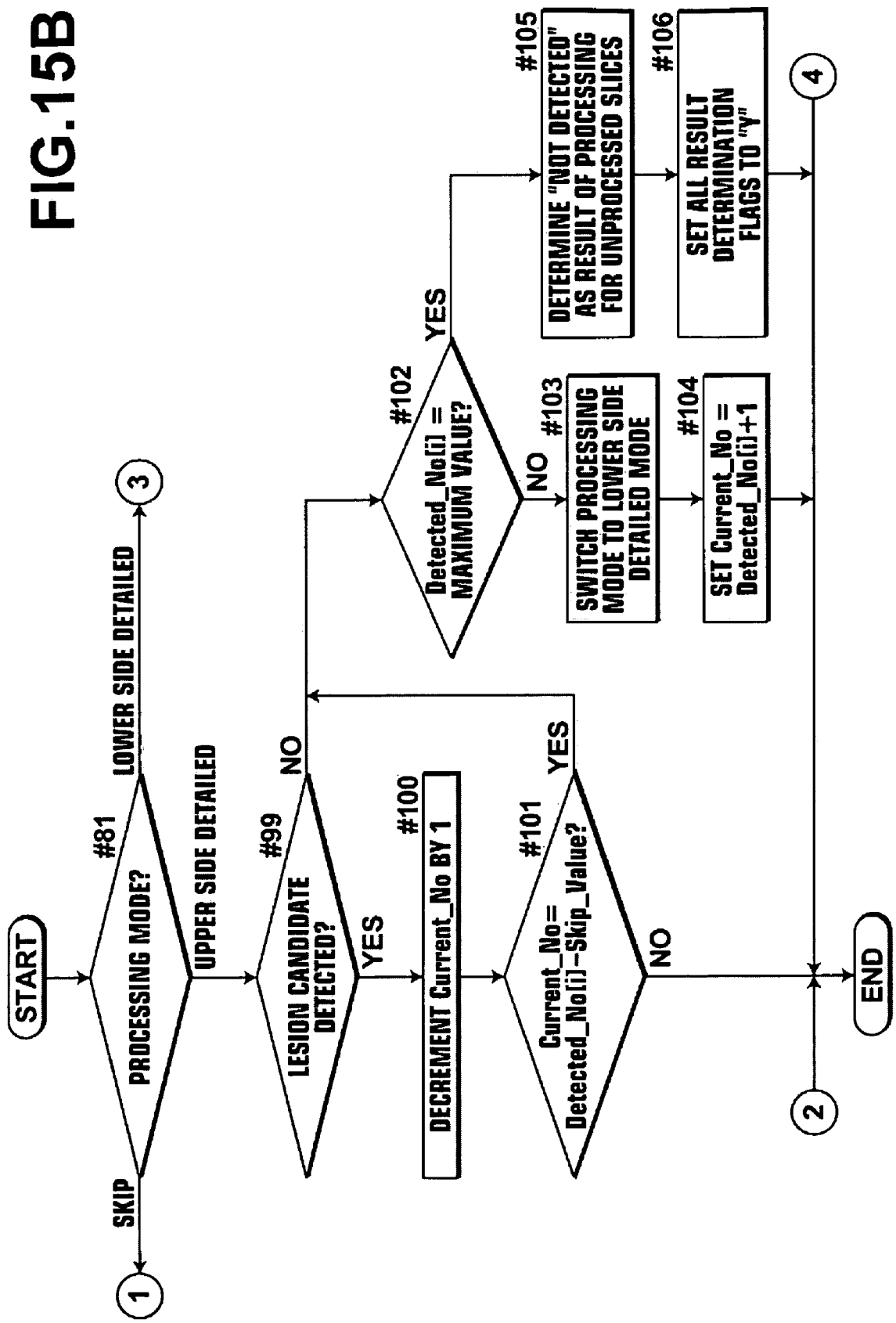
FIG. 15B is a flow chart of the first implementation example of the lesion candidate detection process carried out in the image processing system of the invention.
Figure 15C:
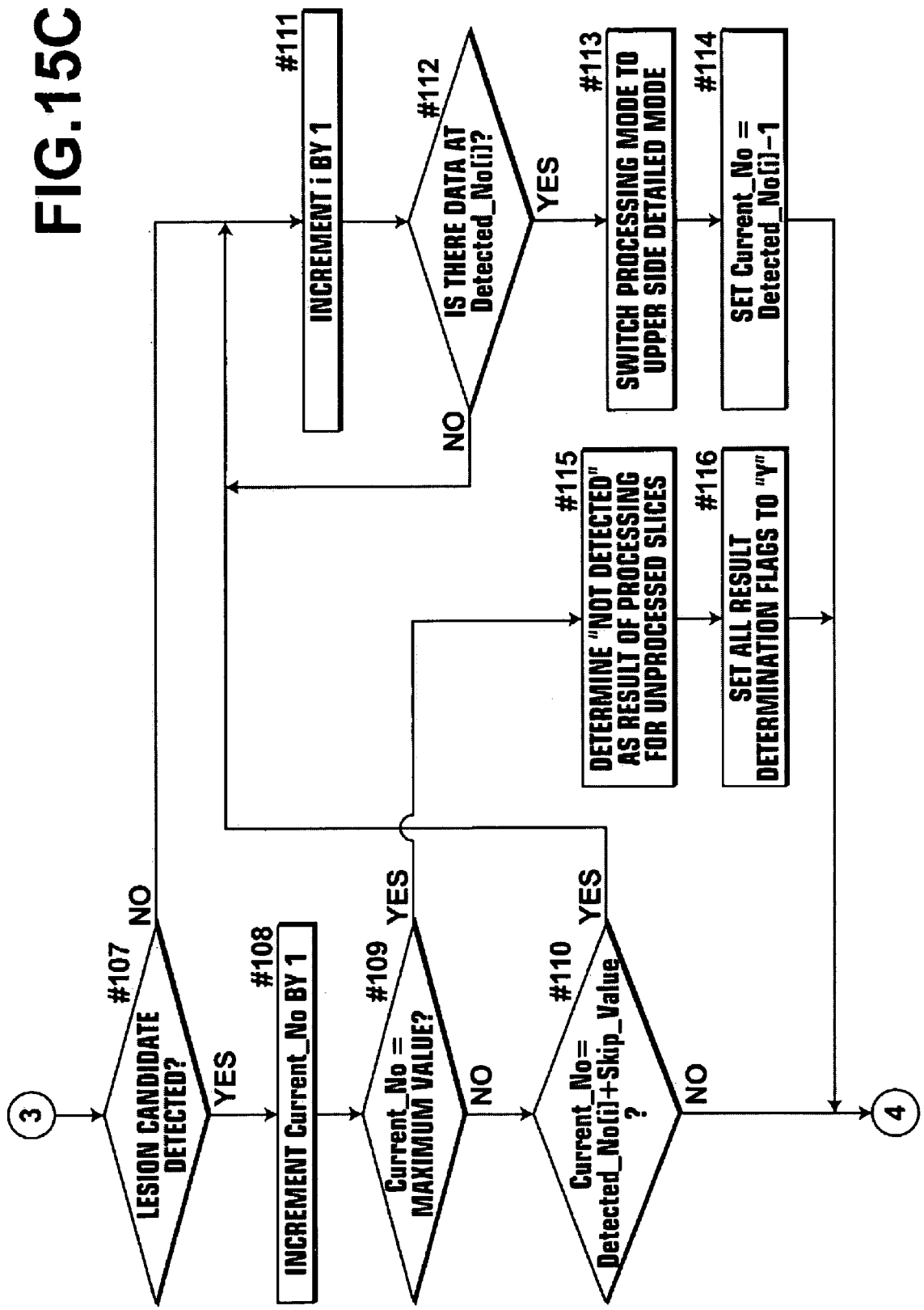
FIG. 15C is a flow chart of the first implementation example of the lesion candidate detection process carried out in the image processing system of the invention, FIG. 16 schematically illustrates one example of a result of processing of a second implementation example of a lesion candidate detection process carried out in the image processing system of the invention.

FIGS. 15A, 15B and 15C illustrate one example of the flow chart that implements the operation of step #13 in FIG. 4 of the first implementation example carried out by the controlling unit 21, i.e., the operations to determine the result of the image analysis for unprocessed image data and to determine the next image data to be processed. In this example, the variables Current_No and Current_Result store the same information as those of the imaged part recognition process.

This implementation example includes three processing modes: a skip mode for determining the next slice image to be processed by the image analysis unit 23 with skipping some of the slice images; an upper side detailed mode for determining each of adjacent slice images above a reference slice image as the next slice image to be processed by the image analysis unit 23, upward from the reference slice image without skipping any slice image; and a lower side detailed mode for determining each of adjacent slice images below the reference slice image as the next slice image to be processed by the image analysis unit 23, downward from the reference slice image without skipping any slice image (#81). It should be noted that the number of skipped slice images during the skip mode is determined according to Eq. 2 from the minimum value of the possible size of the lesion to be detected defined in advance in the configuration file and the slice interval of the slice images to be processed obtained by the associated information obtaining unit 22a, and is stored at the variable Skip_Value. Further, when the program implementing this process is started up, the Current_No is initialized to "1" and the processing mode is initialized to the skip mode.

Basically, the controlling unit 21 controls the image analysis unit 23 to sequentially apply the lesion candidate detection to the slice images to be processed in the order from the slice image of the slice number 1 to the slice image of the last slice number, with skipping the slice images by the value of the Skip_Value (#81: left, #85: No, #86 to #88). If a lesion candidate is detected (#82: Yes), the slice number of the slice image from which the lesion candidate is detected (i.e., the value of the Current_No) is stored at a variable Detected_No [i] (#83). It should be noted that "i" is a suffix, and when the lesion candidate is detected from more than one slice images, the suffix "i" is sequentially incremented (#84). When the last slice image is reached during the skip mode (#85: Yes), whether or not there is data at the Detected_No[i] is checked (#90). If there is data at the Detected_No[i] (#90: Yes), the processing mode is switched to the upper side detailed mode (#97). In the upper side detailed mode, the slice number of the next slice image to be processed is repeatedly determined one by one from the slice number at the Detected_No[i] in the direction in which the slice number becomes smaller (upward), until the lesion candidate is no longer detected by the image analysis unit 23 (#98, #81: down, #99 and #100). Thereafter, the processing mode is switched to the lower side detailed mode (#103), and the slice number of the next slice image to be processed is repeatedly determined one by one from the slice number at the Detected No[i] in the direction in which the slice number becomes larger (downward), until the lesion candidate is no longer detected by the image analysis unit 23 (#104, #81: right, #107 and #108). When the processing in the upper side detailed mode and the lower side detailed mode has been completed for all the slice numbers stored at the Detected_No [i], the processing result for the slice images of the slice numbers which have not been processed by the image analysis unit 23 is determined as "Not Detected" (#95, #105 and #115), and all the result determination flags are set to "Y" to indicate that there is no next image data to be processed (#96, #106 and #116). It should be noted that if the lesion candidate is detected from the slice image at the upper end or the bottom end of the slice images to be processed, the processing in the upper side detailed mode or the lower side detailed mode is not carried out (#91: Yes, #92 and #102: Yes).

Next, a second implementation example of the lesion candidate detection process is described. FIG. 16 schematically illustrates the one example thereof. In this example, if no lesion candidate has been detected from the first slice image processed by the image analysis unit 23, ten slice images are skipped to apply the processing by the image analysis unit 23 to the slice image of the next slice number ($RST_{161}$, $RST_{162}$). If a lesion candidate is detected (the slice number 21 in $RST_{162}$), the image analysis unit 23 applies the lesion candidate detection to the adjacent slice images on the both sides of the slice image containing the detected lesion candidate, one by one in the direction away from the slice image containing the detected lesion candidate ($RST_{163}$). If slice images containing no lesion candidate are found (the slice numbers 17 and 23 in $RST_{163}$), ten slice images are skipped from the lower one of these slice images (the slice number 23 in $RST_{163}$), and the process by the image analysis unit 23 is applied to the slice image of the next slice number (the slice number 33 in $RST_{163}$) ($RST_{164}$). These operations are repeated until the slice image at the bottom end of the slice images to be processed is reached. For slice images which has not been subjected to the processing by the image analysis unit 23, it is determined, from the lesion candidate detection result which has been obtained so far, that no lesion candidate will be detected from these slice images, without applying the processing by the image analysis unit 23 to these slice images. It should be noted that the number of skipped slice images is calculated in the same manner as the above-described Eq. 2.

In FIG. 16, the detection results for the slice images which have been determined that no lesion candidate will be detected therefrom without being processed by the image analysis unit 23 are indicated with an arrow. As shown in the drawing, in this example, the load of transfer of the image data from the image server 3 to the image processing workstation 2 and the load of processing by the image analysis unit 23 on the image processing workstation 2 are reduced for 38 images of the 50 slice images.

Figure 17A:
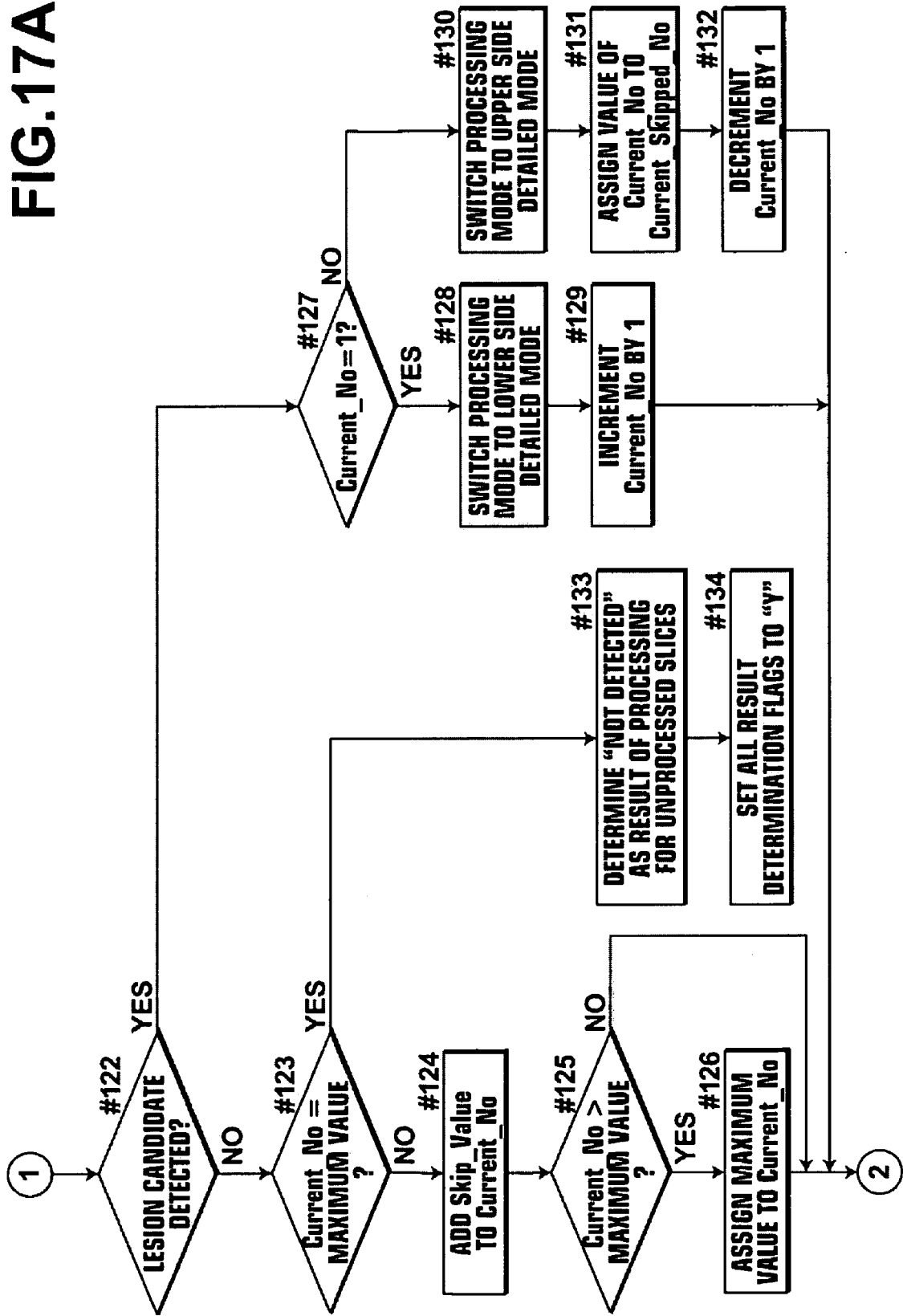
FIG. 17A is a flow chart of the second implementation example of the lesion candidate detection process carried out in the image processing system of the invention.
Figure 17B:
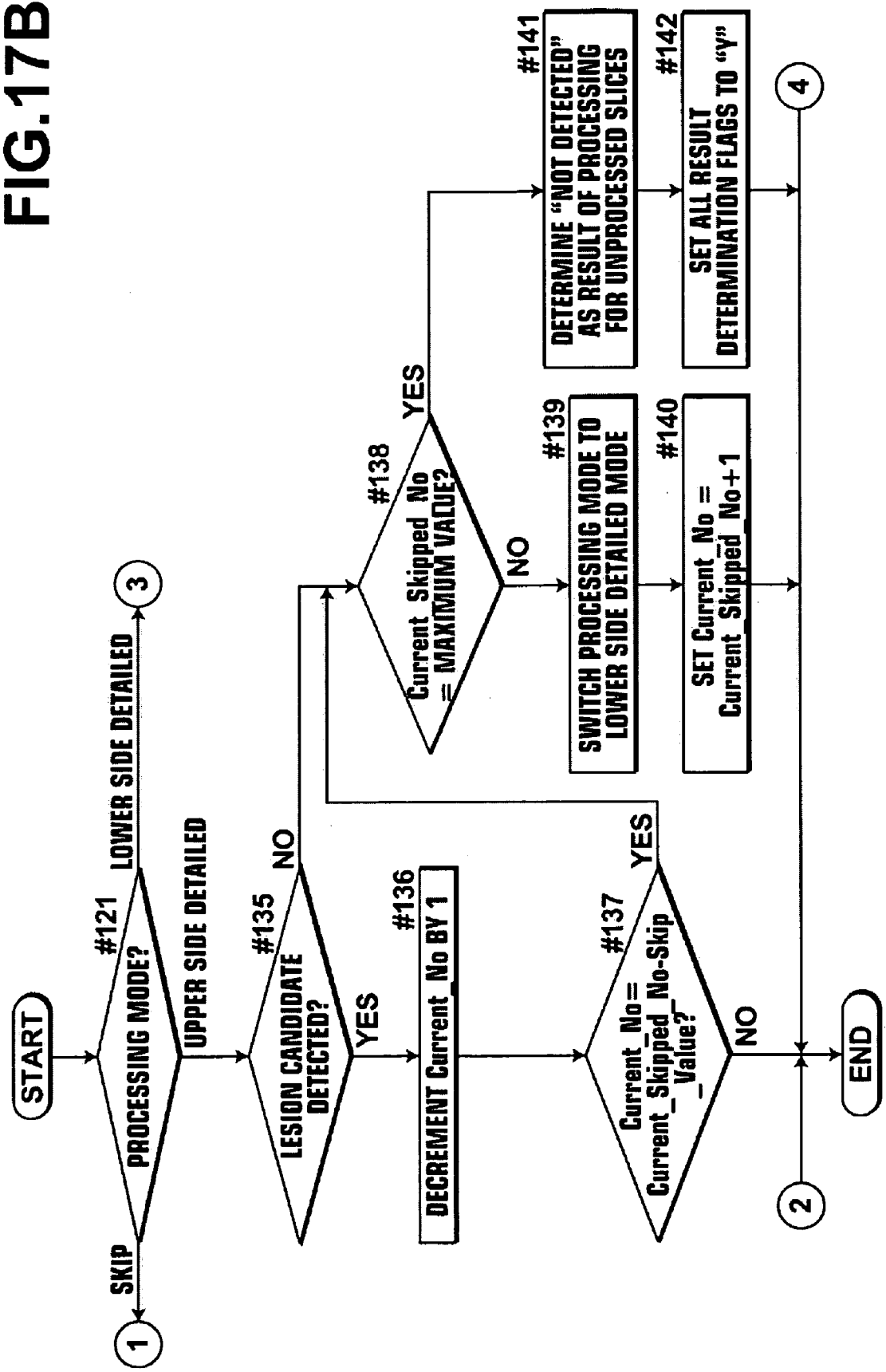
FIG. 17B is a flow chart of the second implementation example of the lesion candidate detection process carried out in the image processing system of the invention.

FIGS. 17A, 17B and 17C illustrate one example of the flow chart that implements the operation of step #13 in FIG. 4 of the second implementation example carried out by the controlling unit 21, i.e., the operations to determine the result of the image analysis for unprocessed image data and to determine the next image data to be processed. In this example, the variables Current_No, Current_Result and Skip_Value store the same information as those of the first implementation example.

Similarly to the first implementation example, this example includes three processing modes: the skip mode, the upper side detailed mode and the lower side detailed mode. However, in this example, the controlling unit 21 determines whether or not a lesion candidate is detected each time the image analysis unit 23 processes the slice image of the slice number set during the skip mode (#122). If no lesion candidate is detected (#122: No), the skip mode is continued (#124). In contrast, if a lesion candidate is detected (#122: Yes), the current slice number (the value at the Current_No) is stored at the Current Skipped No (#131), and the slice image of the Current_Skipped_No is used as the reference to carry out the processing in the upper side detailed mode and the lower side detailed mode. When the processing in these detailed modes has been completed, the operation mode is switched to the skip mode (#148), and the slice images are skipped by the value of the Skip_Value from the slice image at the bottom end of the slice images processed in the lower side detailed mode (#149) to carry out the next processing. Other points are the same as the first implementation example.

(3) Human Body Region Extraction Process

Next, an implementation example of a process to extract a human body region from a slice image implemented on the image processing system of the invention is described. In this implementation example, the image analysis unit 23 may use any of known methods to extract the human body region from the image analysis. For example, the method disclosed in Japanese Unexamined Patent Publication No. 9 (1997)-187444, which is referenced in the description of the normalization processing unit 23a shown in FIG. 7, may be used.

Figure 18:
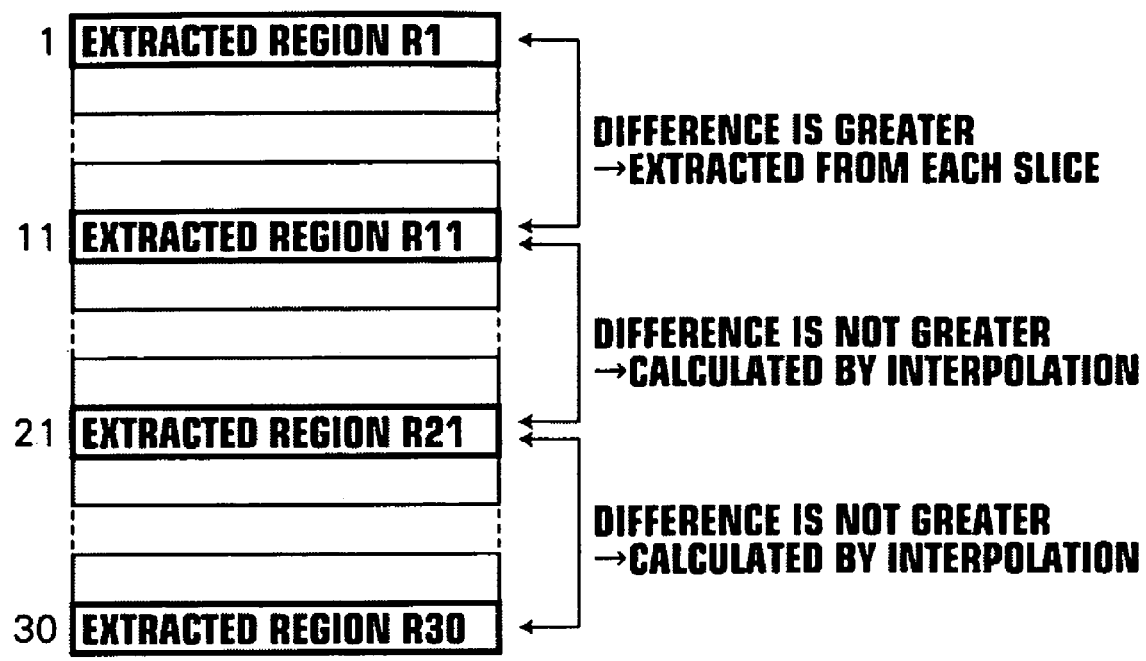

FIG. 18 schematically illustrates this implementation example. In this example, first, every ten slice images of 30 slice images to be processed are skipped during the processing by the image analysis unit 23, and regions R1, R11, R21 and R30 are extracted from the slice images of the slice numbers 1, 11, 21 and 30. The regions R1 and R11, R11 and R21, and R21 and R30 are respectively compared to each other. If a difference between these regions is not greater than a predetermined criterion, the human body region represented by each slice image between the slice images containing the detected regions is calculated by interpolation using information of these regions. For example, a region difference between the regions R11 and R21 is not greater than the predetermined criterion, and therefore the human body region represented by each of the slice images of the slice numbers 12 to 20 is calculated by interpolation using the information of the regions R11 and R21. In contrast, if the region difference is greater than the predetermined criterion, the processing by the image analysis unit 23 is applied to each slice image between the slice images containing the detected regions.

In FIG. 18, the human body region is determined by interpolation for 17 images of the 30 slice images, and thus the load of transfer of the image data from the image server 3 to the image processing workstation 2 and the load of processing by the image analysis unit 23 on the image processing workstation 2 are reduced.

It should be noted that the predetermined criterion may be a predetermined feature quantity calculated from the area of the extracted human body region, the area of a difference image which is generated based on the difference between the extracted regions, or the area or the perimeter of the extracted human body region.

Figure 19A:
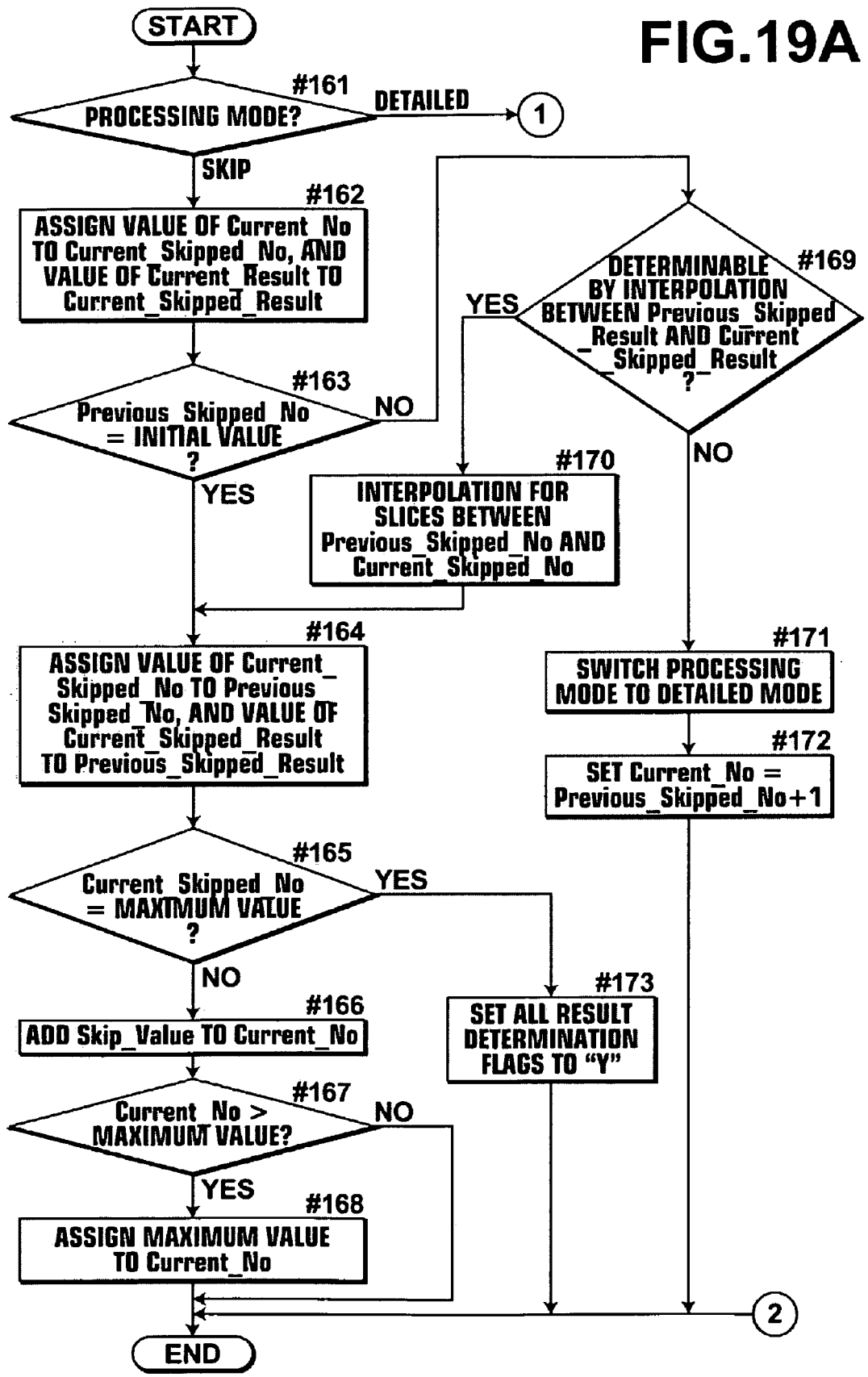
FIG. 19A is a flow chart of the implementation example of the human body region extraction process carried out in the image processing system of the invention.
Figure 19B:
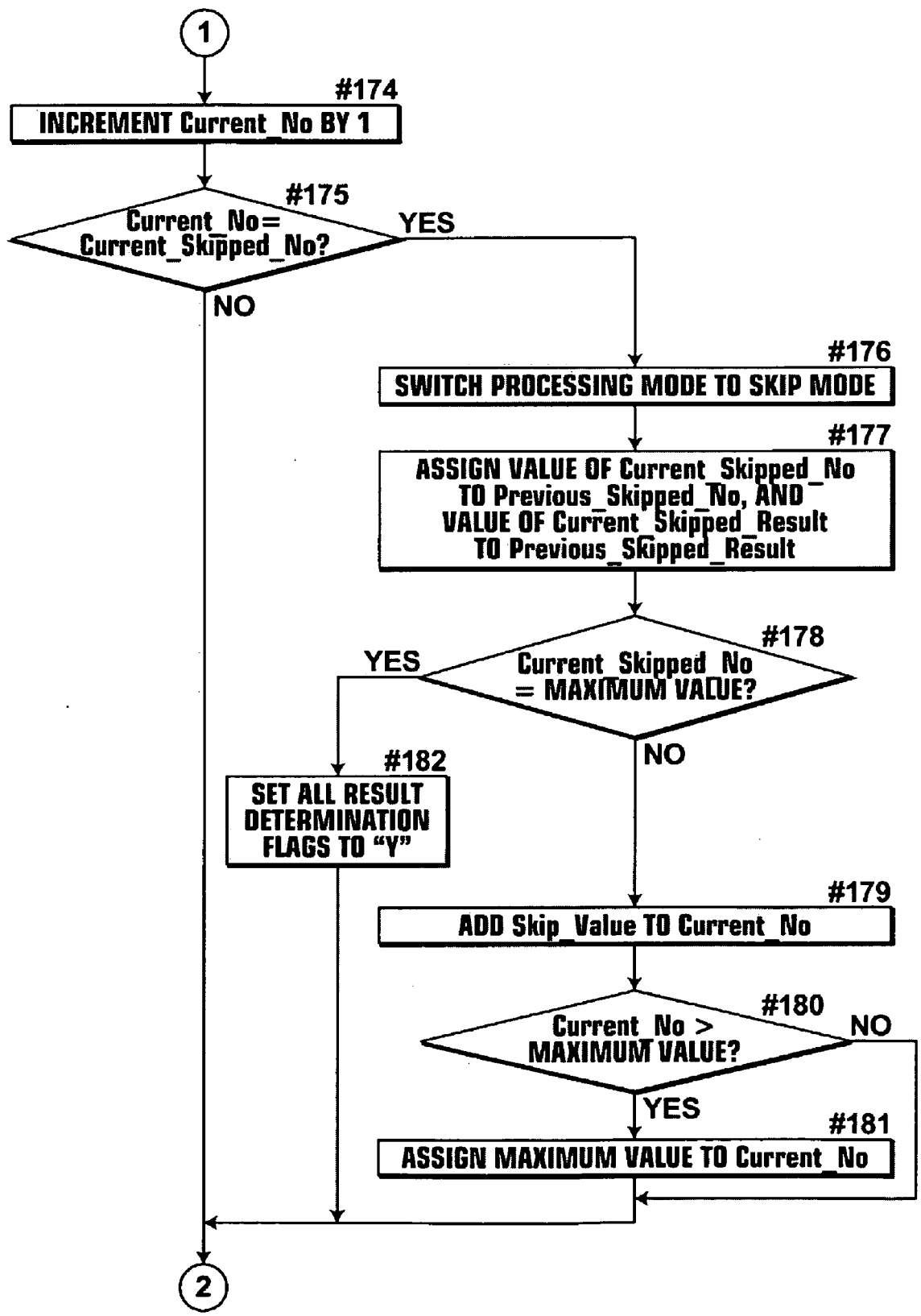
FIG. 19B is a flow chart of the implementation example of the human body region extraction process carried out in the image processing system of the invention, FIG. 20 schematically illustrates the functional configuration of the image processing system and the configuration of the image database according to another embodiment of the invention.

FIGS. 19A and 19B illustrate one example of the flow chart that implements the operation of step #13 in FIG. 4 of the this implementation example carried out by the controlling unit 21, i.e., the operations to determine the result of the image analysis for unprocessed image data and to determine the next image data to be processed. In this example, the variables Current_No and Current_Result store the same information as those of the previous implementation examples.

This implementation example is similar to the second implementation example of the imaged part recognition process. The controlling unit 21 determines, for each skip during the skip mode, whether or not it is possible to determine the human body region for unprocessed slice images in the skipped zone by interpolation (#169). If it is determined to be possible to determine the human body region (#169: Yes), the human body region is determined for the slice images in the zone (#170), and another skip is made (#166). If it is determined to be impossible to determine the human body region (#169: No), the processing mode is switched to the detailed mode (#171), and the processing to extract the human body region by the image analysis unit 23 is applied to all the slice images in the zone (#172, #161: details, #174 to #175: No). When the extraction process has been completed for all the slices in the zone (#175: Yes), the operation mode is switched back to the skip mode (#176), and a skip is made to the next zone (#177, #179). Finally, when the extraction result has been determined for all the slice images (#165: Yes, #178: Yes), all the result determination flags are set to "Y" to indicate that there is no next image data to be processed (#173, #182).

3. Variation In Configuration Of Image Processing System Of The Invention

Figure 20:
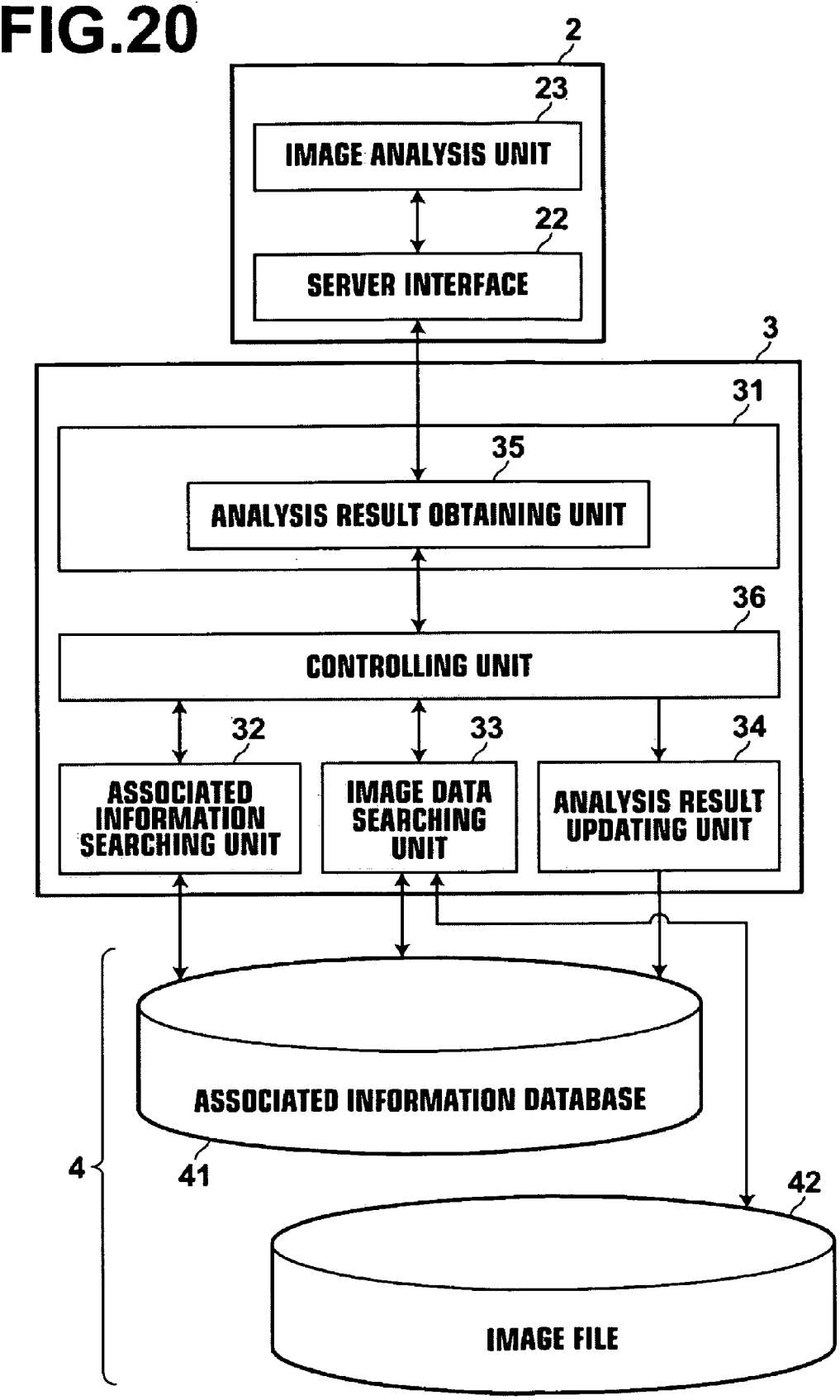

Although the image processing system described in section 1 above includes the controlling unit 21 provided on the image processing workstation 2, an embodiment in which the controlling unit 21 is provided on the image server 3 is also conceivable. FIG. 20 schematically illustrates functional blocks of the image processing system and the configuration of the image database 4 according to this embodiment. Comparing the FIG. 20 with FIG. 2, not only the controlling unit 21 but also the associated information obtaining unit 22a, the image data obtaining unit 22b and the analysis result sending unit 22c are removed from the image processing workstation 2 shown in FIG. 20. On the other hand, the image server 3 shown in FIG. 20 additionally includes a controlling unit 36, and the client interface 31 includes an analysis result obtaining unit 35.

Figure 21:
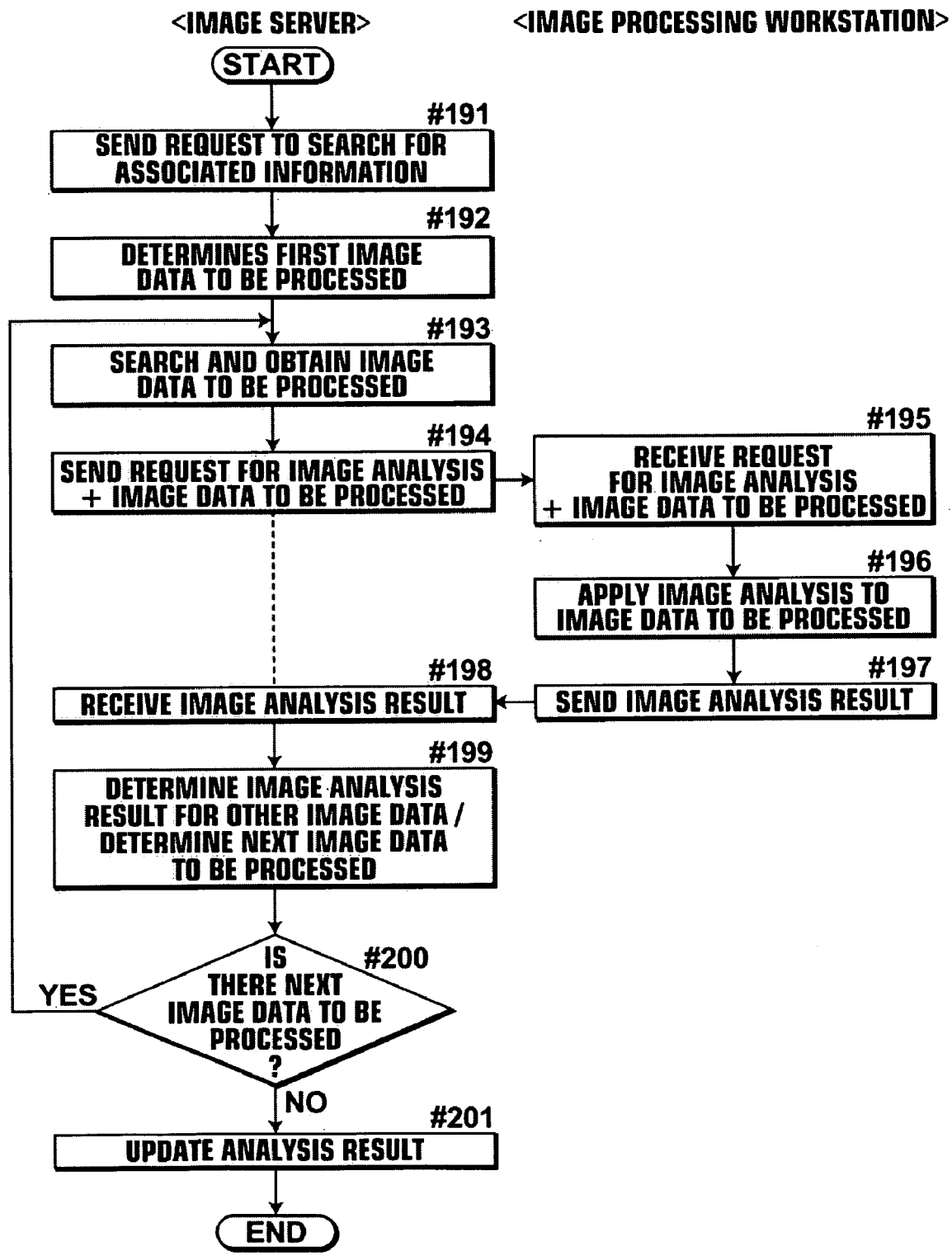
FIG. 21 is a flow chart illustrating the flow of a process carried out in the image processing system according to another embodiment of the invention.

FIG. 21 is a flow chart illustrating the flow of a process carried out in the image processing system of this embodiment. The flow of this process is achieved by cooperation of the other processing units of the image server 3 and the processing units of the image processing workstation 2 based on control by the controlling unit 36 of the image server 3.

First, as the image processing program of the invention is started up on the image server 3, the controlling unit 36 obtains, from the startup parameter, the examination ID and the series ID indicating the image to be processed. Then, the controlling unit 36 causes the associated information searching unit 32 to obtain the associated information, such as the number of slices and the slice interval, of the image taken during a series in an examination corresponding to the examination ID and the series ID, and the associated information searching unit 32 searches through the series information table 41a of the associated information database 41 to obtain the associated information corresponding to the examination ID and series ID contained in the request to search and hands over the associated information to the controlling unit 36, accordingly (#191). Based on the obtained associated information, the controlling unit 36 determines the first image data to be processed by the image analysis unit 23 (#192). The controlling unit 36 causes the image data searching unit 33 to obtain the slice image data associated with the examination ID, the series ID and the slice numbers of the slice images to be processed, and the image data searching unit 33 searches through the slice information table 41b of the associated information database 41 to obtain the image data corresponding to the examination ID, the series ID and the slice numbers contained in the request to search and hands over the image data to the controlling unit 36 (#193).

Then, the controlling unit 36 invokes the analysis result obtaining unit 35 to obtain the image processing result for the first image data to be processed, and the analysis result obtaining unit 35 sends to the image processing workstation 2 a request for image analysis together with the first image data to be processed (#194). The server interface 22 of the image processing workstation 2 receives the request for image analysis and the first image data to be processed sent from the image server 3 (#195), and hands over the request to the image analysis unit 23. The image analysis unit 23 reads in the first image data to be processed from the memory region, applies the predetermined image analysis process, and returns the analysis result to the server interface 22 (#196). The server interface 22 sends the analysis result to the image server 3 (#197). The analysis result obtaining unit 35 of the image server 3 receives and stores the analysis result sent thereto in a predetermined memory region, and returns to the controlling unit 36 a message informing that the analysis result has been obtained (#198).

Based on the result of the analysis carried out by the image analysis unit 23, the controlling unit 36 determines whether or not it is possible to determine the image analysis result for all the slice image data associated with the examination ID and the series ID which are given at the startup. If it is determined to be possible to determine the image analysis result, the image analysis result is determined for all the slice image data. If it is determined to be impossible to determine the image analysis result, the next image data to be processed is determined (#199). It should be noted that the image analysis result determined by the controlling unit 36 is also stored in a storage region for storing the analysis result corresponding to the slice number of the determined slice image within the memory region in the form of the analysis result list containing the results associated with the respective slice numbers, in which the above-described image analysis result by the image analysis unit 23 is stored.

If it is determined that there is the next image data to be processed (#200: Yes), the controlling unit 36 invokes the image data searching unit 33 to obtain the slice image data associated with the examination ID, the series ID and the slice number of the next slice image to be processed, and the operations in steps #193 to #200 are repeated until it is determined to be possible to determine the image analysis result for all the slice image data to be processed (#200: No).

When the image analysis result has been determined for all the slice image data to be processed (#200: No), the controlling unit 36 invokes the analysis result updating unit 34 to carry out the update process to register the analysis result, which is stored in the memory region in the form of the analysis result list containing the results associated with the respective slice numbers, into the analysis result entry of the slice information table 41b (#201).

As described above, similarly to the embodiment in which the controlling unit is provided on the image processing workstation 2, the number of slice images necessary for obtaining the image analysis result for all the slice images to be processed is reduced in the embodiment in which the controlling unit is provided on the image server 3. Therefore, the load of communication between the image server 3 and the image processing workstation 2 and the load of the image processing on the image processing workstation 2 are reduced, thereby improving the processing efficiency of the entire system.

It should be noted that various modifications can be made on the system configuration, the process flow, the database configuration, and the like, in the above-described embodiments without departing from the scope and spirit of the present invention, and such modifications are intended to be encompassed by the technical scope of the invention. The above-described embodiments are presented only by way of example, and should not be construed to limit the technical scope of the invention.

For example, in a 3-tier client-server system including an image display terminal, an image processing server and an image server, the server interface 22 (the associated information obtaining unit 22a, the image data obtaining unit 22b and the analysis result sending unit 22c) and the image analysis unit 23 may be provided on the image processing server to implement any of the above-described embodiments and implementation examples.

Further, if parallel processing can be carried out on a plurality of slice images at the image analysis unit 23 of the image processing workstation 2, the image data of the plurality of slice image may be simultaneously obtained, as necessary. For example, the image data of the slice images of the slice numbers 1, 4, 7, 10 and 16 shown in FIG. 12 may be simultaneously received from the image server 3, and the image analysis unit 23 may process the image data in parallel to simultaneously obtain the processing result for these slice images.

According to the present invention, in an image processing system in which an image processing device applies image processing to image data of a cross-sectional image sent from an image storage device via a network, it is determined, based on a predetermined determination criterion, whether it is possible to determine a result of the image processing for the image data of a cross-sectional image representing a cross-section taken at an arbitrary point along a composition axis in an original image based on the result of the image processing applied by the image processing device to the image data of the cross-sectional image sent so far from the image storage device. If it is determined to be impossible to determine the result, image data of a next cross-sectional image to be processed by the image processing unit to determine the result of the image processing is determined, and the image data of the next cross-sectional image to be processed is sent from the image storage device to the image processing device. If it is determined to be possible to determine the result, the result of the image processing is determined for the image data of the cross-sectional image representing the cross-section taken at the arbitrary point, without sending the image data of another cross-sectional image from the image storage device to the image processing device. Thus, the number of cross-sectional images necessary for obtaining the result of the image processing for the entire original image is reduced, and this reduces the load of communication between the image storage device and the image processing device and the load of the image processing by the image processing device, thereby improving the processing efficiency of the entire system.

What is claimed is:

1. An image processing system comprising:
an image storage device and an image processing device being connected to be able to communicate with each other via a network, wherein
the image storage device comprises: an image database for storing image data of a three-dimensional or higher-dimensional original image representing a subject; and an image sending means for sending, to the image processing device, image data of cross-sectional images representing cross-sections taken at given points along a predetermined composition axis in the original image,
the image processing device comprises: an image receiving means for receiving the image data of the cross-sectional images sent by the image sending means; and an image processing means for obtaining subject information about the subject for each of the image data of the cross-sectional images, and
the image processing system further comprises a controlling means, wherein
if a first piece of the subject information obtained by the image processing means from image data of a cross-sectional image representing a cross-section at a first point along the composition axis and a second piece of the subject information obtained by the image processing means from image data of a cross-sectional image representing a cross-section at a second point along the composition axis satisfy a predetermined relationship defined based on anatomical characteristics of the subject, the control means exerts control to determine the subject information in a cross-sectional image representing a cross-section at an arbitrary point between the first point and the second point along the composition axis based on at least one of the first piece of the subject information and the second piece of the subject information, and if the first piece of the subject information and the second piece of the subject information do not satisfy the predetermined relationship, the control means controls the image sending means to send, as image data to be processed by the image processing means, image data of a cross-sectional image representing a cross-section at a given point between the first point and the second point along the composition axis.

2. The image processing system as claimed in claim 1, wherein the controlling means repeats the control with using, as the first point and the second point, adjacent two points along the composition axis corresponding to the cross-sectional images, from which the pieces of the subject information are obtained by the image processing means, until the subject information in a cross-sectional image representing a cross-section at an arbitrary point along the composition axis in the original image is obtained or determined.

3. The image processing system as claimed in claim 1 or 2, wherein a distance between the first point and the second point in the composition axis direction is determined based on anatomical characteristics of the subject.

4. The image processing system as claimed in claim 1, wherein
the composition axis is a body axis of the subject,
the image processing comprises recognizing a part of the subject represented by each cross-sectional image to obtain the recognized part as the subject information, and
if a relationship that the first piece of the subject information and the second piece of the subject information are the same is satisfied, the controlling means determines that the subject information in a cross-sectional image representing a cross-section at an arbitrary point between the first point and the second point along the composition axis is the same as the first piece of the subject information or the second piece of the subject information.

5. The image processing system as claimed in claim 3, wherein
the image processing comprises detecting a predetermined structure represented by the cross-sectional image to obtain a result of the detection as the subject information,
the distance is smaller than a possible length of the predetermined structure, and
if a relationship that the predetermined structure is not detected from cross-sectional images representing cross-sections at the first point and the second point is satisfied, the controlling means determines that the predetermined structure is not detected from a cross-sectional image representing a cross-section at an arbitrary point between the first point and the second point along the composition axis, or if the predetermined structure is detected from a cross-sectional image representing a cross-section at at least one of the first point and the second point, the controlling means controls the image sending means to send, as image data to be processed by the image processing means, image data of a cross-sectional image representing a cross-section at a point away from the at least one of the first point and the second point by a distance smaller than the distance between the first point and the second point.

6. The image processing system as claimed in claim 1, wherein
the predetermined image processing comprises detecting a predetermined region from the cross-sectional image to obtain the detected region as the subject information, and
if a relationship that a difference between the regions detect from cross-sectional images representing cross-sections at the first point and the second point is small enough to satisfy a predetermined criterion is satisfied, the controlling means determines the predetermined region in a cross-sectional image representing a cross-section at an arbitrary point between the first point and the second point along the composition axis through interpolation based on the regions detected from the cross-sectional images representing the cross-sections at the first point and the second point.

7. An image storage device connected to an image processing device to be able to communicate with each other via a network, the image storage device comprising:
an image database for storing image data of a three-dimensional or higher-dimensional original image representing a subject;
an image sending means for sending, to the image processing device, image data of cross-sectional images representing cross-sections taken at given points along a predetermined composition axis in the original image; and
controlling means for exerting control to receive a result of image processing to obtain subject information about the subject carried out by the image processing device for each of the image data of the cross-sectional images sent so far, and if a first piece of the subject information obtained by the image processing device from image data of a cross-sectional image representing a cross-section at a first point along the composition axis and a second piece of the subject information obtained by the image processing device from image data of a cross-sectional image representing a cross-section at a second point along the composition axis satisfy a predetermined relationship defined based on anatomical characteristics of the subject, the controlling means exerts control to determine the subject information in a cross-sectional image representing a cross-section at an arbitrary point between the first point and the second point along the composition axis based on at least one of the first piece of the subject information and the second piece of the subject information, and if the first piece of the subject information and the second piece of the subject information do not satisfy the predetermined relationship, the controlling means controlling the image sending means to send, as image data to be processed by the image processing device, image data of a cross-sectional image representing a cross-section at a given point between the first point and the second point along the composition axis.

8. An image processing device connected to an image storage device to be able to communicate with each other via a network, the image processing device comprising:
image receiving means for receiving image data of cross-sectional images representing cross-sections taken at given points along a predetermined composition axis in a three-dimensional or higher-dimensional original image representing a subject sent by the image storage device;

image processing means for carrying out image processing to obtain subject information about the subject for each of the image data of the cross-sectional images; and controlling means, wherein if a first piece of the subject information obtained by the image processing means from image data of a cross-sectional image representing a cross-section at a first point along the composition axis and a second piece of the subject information obtained by the image processing means from image data of a cross-sectional image representing a cross-section at a second point along the composition axis satisfy a predetermined relationship defined based on anatomical characteristics of the subject, the controlling means exerts control to determine the subject information in a cross-sectional image representing a cross-section at an arbitrary point between the first point and the second point along the composition axis based on at least one of the first piece of the subject information and the second piece of the subject information, and if the first piece of the subject information and the second piece of the subject information do not satisfy the predetermined relationship, controlling means requests the image storage device to send, as image data to be processed by the image processing means, image data of a cross-sectional image representing a cross-section at a given point between the first point and the second point along the composition axis.

9. An image processing method to be carried out in an image processing system comprising an image storage device and an image processing device being connected to be able to communicate with each other via a network, the method comprising:

sending, from the image storage device to the image processing device, image data of cross-sectional images representing cross-sections taken at given points along a predetermined composition axis in a three-dimensional or higher-dimensional original image representing a subject;

receiving the sent image data of the cross-sectional images and obtaining subject information about the subject for each of the image data of the cross-sectional images at the image processing device; and if a first piece of the subject information obtained by the image processing from image data of a cross-sectional image representing a cross-section at a first point along the composition axis and a second piece of the subject information obtained by the image processing from image data of a cross-sectional image representing a cross-section at a second point along the composition axis satisfy a predetermined relationship defined based on anatomical characteristics of the subject, determining the subject information in a cross-sectional image representing a cross-section at an arbitrary point between the first point and the second point along the composition axis based on at least one of the first piece of the subject information and the second piece of the subject information, and if the first piece of the subject information and the second piece of the subject information do not satisfy the predetermined relationship, sending, as image data to be subjected to the image processing, image data of a cross-sectional image representing a cross-section at a given point between the first point and the second point along the composition axis from the image storage device to the image processing device.

10. A program stored in a non-transitory computer readable medium to be executed on an image processing system including an image storage device and an image processing device being connected to be able to communicate with each other via a network, the program comprising the instructions of:

causing the image storage device to send, to the image processing device, image data of cross-sectional images representing cross-sections taken at given points along a predetermined composition axis in a three-dimensional or higher-dimensional original image representing a subject;

causing the image processing device to receive the sent image data of the cross-sectional images and to carry out image processing to obtain subject information about the subject for each of the image data of the cross-sectional images; and causing a unit in the image processing system to carry out the following operation:

if a first piece of the subject information obtained by the image processing from image data of a cross-sectional image representing a cross-section at a first point along the composition axis and a second piece of the subject information obtained by the image processing from image data of a cross-sectional image representing a cross-section at a second point along the composition axis satisfy a predetermined relationship defined based on anatomical characteristics of the subject, determining the subject information in a cross-sectional image representing a cross-section at an arbitrary point between the first point and the second point along the composition axis based on at least one of the first piece of the subject information and the second piece of the subject information, and if the first piece of the subject information and the second piece of the subject information do not satisfy the predetermined relationship, sending, as image data to be subjected to the image processing, image data of a cross-sectional image representing a cross-section at a given point between the first point and the second point along the composition axis from the image storage device to the image processing device.

11. A program stored in a non-transitory computer readable medium to be executed on an image storage device being connected to an image processing device to be able to communicate with each other via a network, the program comprising the instructions of:

causing the image processing device to send image data of cross-sectional images representing cross-sections taken at given points along a predetermined composition axis in a three-dimensional or higher-dimensional original image representing a subject;

causing to receive a result of image processing to obtain subject information about the subject carried out by the image processing device for each of the image data of the cross-sectional images sent so far; and causing the following operation:

if a first piece of the subject information obtained by the image processing device from image data of a cross-sectional image representing a cross-section at a first point along the composition axis and a second piece of the subject information obtained by the image processing device from image data of a cross-sectional image representing a cross-section at a second point along the composition axis satisfy a predetermined relationship defined based on anatomical characteristics of the subject, determining the subject information in a cross-sectional image representing a cross-section at an arbitrary point between the first point and the second point along the composition axis based on at least one of the first piece of the subject information and the second piece of the subject information, and if the first piece of the subject information and the second piece of the subject information do not satisfy the predetermined relationship, sending, as image data to be processed by the image processing device, image data of a cross-sectional image representing a cross-section at a given point between the first point and the second point along the composition axis to the image processing device.

12. A program stored in a non-transitory computer readable medium to be executed on an image processing device being connected to an image storage device to be able to communicate with each other via a network, the program comprising the instructions of:

causing to receive image data of cross-sectional images representing cross-sections taken at given points along a predetermined composition axis in a three-dimensional or higher-dimensional original image representing a subject sent from the image storage device;

causing to carry out image processing to obtain subject information about the subject for each of the image data of the cross-sectional images; and causing the following operation:

if a first piece of the subject information obtained by the image processing from image data of a cross-sectional image representing a cross-section at a first point along the composition axis and a second piece of the subject information obtained by the image processing from image data of a cross-sectional image representing a cross-section at a second point along the composition axis satisfy a predetermined relationship defined based on anatomical characteristics of the subject, determining the subject information in a cross-sectional image representing a cross-section at an arbitrary point between the first point and the second point along the composition axis based on at least one of the first piece of the subject information and the second piece of the subject information, and if the first piece of the subject information and the second piece of the subject information do not satisfy the predetermined relationship, requesting the image storage device to send, as image data to be subjected to the image processing, image data of a cross-sectional image representing a cross-section at a given point between the first point and the second point along the composition axis.

* * * * *